(12) United States Patent
Musetti

(10) Patent No.: US 8,652,678 B2
(45) Date of Patent: Feb. 18, 2014

(54) BATTERY PACK SYSTEM

(75) Inventor: Louis Jack Musetti, Laguna Beach, CA (US)

(73) Assignee: Vecture Inc., Concord (CA)

( * ) Notice: Subject to any disclaimer, the term of this patent is extended or adjusted under 35 U.S.C. 154(b) by 0 days.

(21) Appl. No.: 13/449,197

(22) Filed: Apr. 17, 2012

(65) Prior Publication Data

US 2013/0273400 A1    Oct. 17, 2013

(51) Int. Cl.
    *H01M 2/06*      (2006.01)
    *H01M 2/20*      (2006.01)

(52) U.S. Cl.
    USPC ............ 429/158; 439/500; 439/189; 439/627

(58) Field of Classification Search
    USPC .......... 429/96–100, 120, 149–160, 163–187, 429/123, 143, 148; 221/282; 206/703–705
    See application file for complete search history.

(56) References Cited

U.S. PATENT DOCUMENTS

| | | | | |
|---|---|---|---|---|
| 2,740,824 | A * | 4/1956 | Stanimirovitch | 429/120 |
| 4,074,017 | A * | 2/1978 | Kinsey | 429/1 |
| 5,366,827 | A * | 11/1994 | Belanger et al. | 429/99 |
| 5,456,994 | A * | 10/1995 | Mita | 429/71 |
| 5,569,552 | A * | 10/1996 | Rao et al. | 429/72 |
| 7,612,526 | B2 * | 11/2009 | Kim | 320/107 |
| 2003/0072997 | A1* | 4/2003 | Estreich et al. | 429/153 |
| 2010/0143795 | A1* | 6/2010 | Partington et al. | 429/178 |
| 2011/0229754 | A1* | 9/2011 | Zhao et al. | 429/158 |
| 2011/0274949 | A1* | 11/2011 | Meintschel et al. | 429/50 |

* cited by examiner

*Primary Examiner* — Basia Ridley
*Assistant Examiner* — Caitlin Wilmot

(57) ABSTRACT

Various embodiments are described herein for a system for providing electric power during use. The battery pack system includes at least one cell carrier assembly configured to provide electric current during use. The cell carrier assembly has a substantially planar configuration. The battery pack system further includes a battery pack enclosure for housing the at least one cell carrier assembly. The battery pack enclosure has at least one wall with at least one channel sized to receive an edge of the cell carrier assembly to locate the cell carrier assembly at a location within the battery pack enclosure and provide a thermal pathway during use.

33 Claims, 12 Drawing Sheets

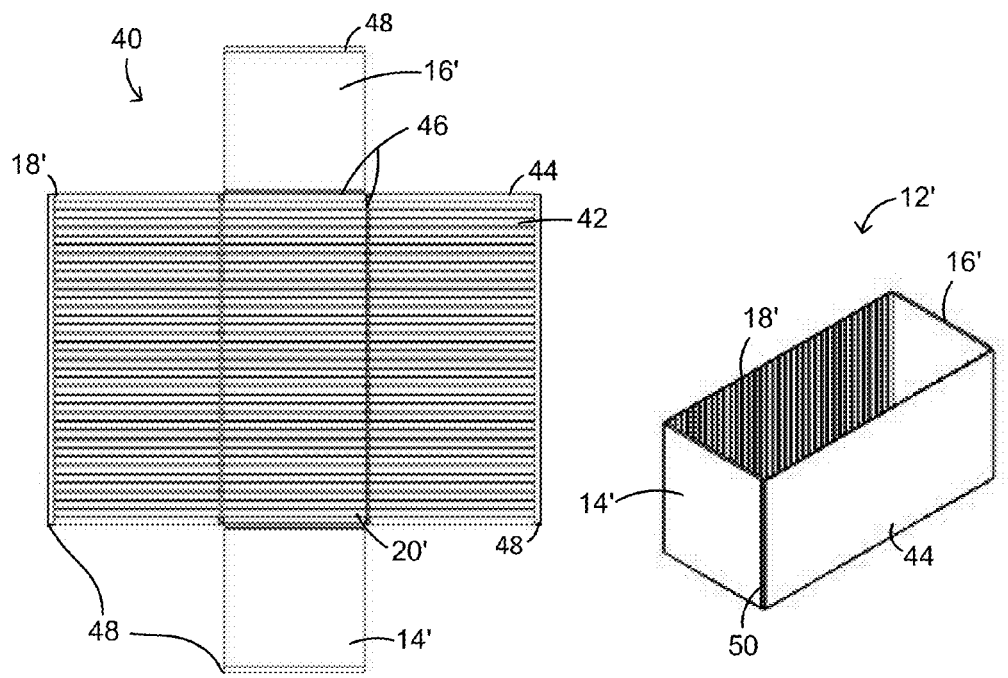
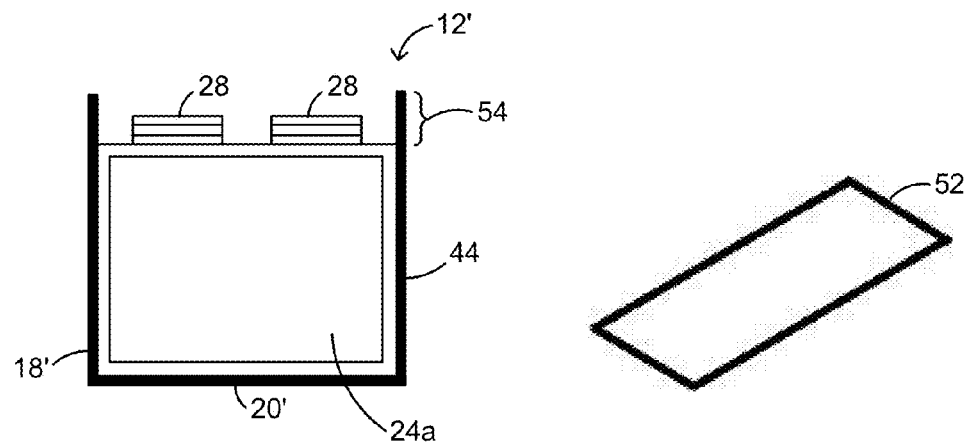
FIG. 3A
FIG. 3B
FIG. 3D
FIG. 3C

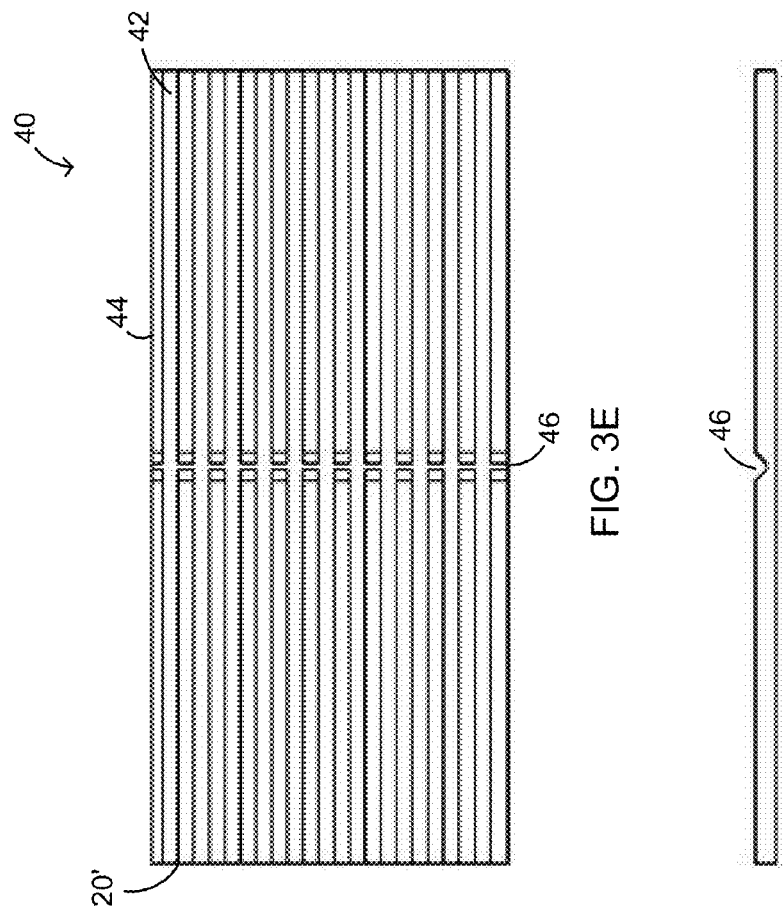
FIG. 3E
FIG. 3F
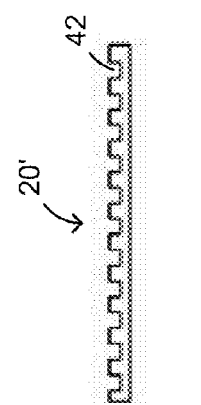
FIG. 3G

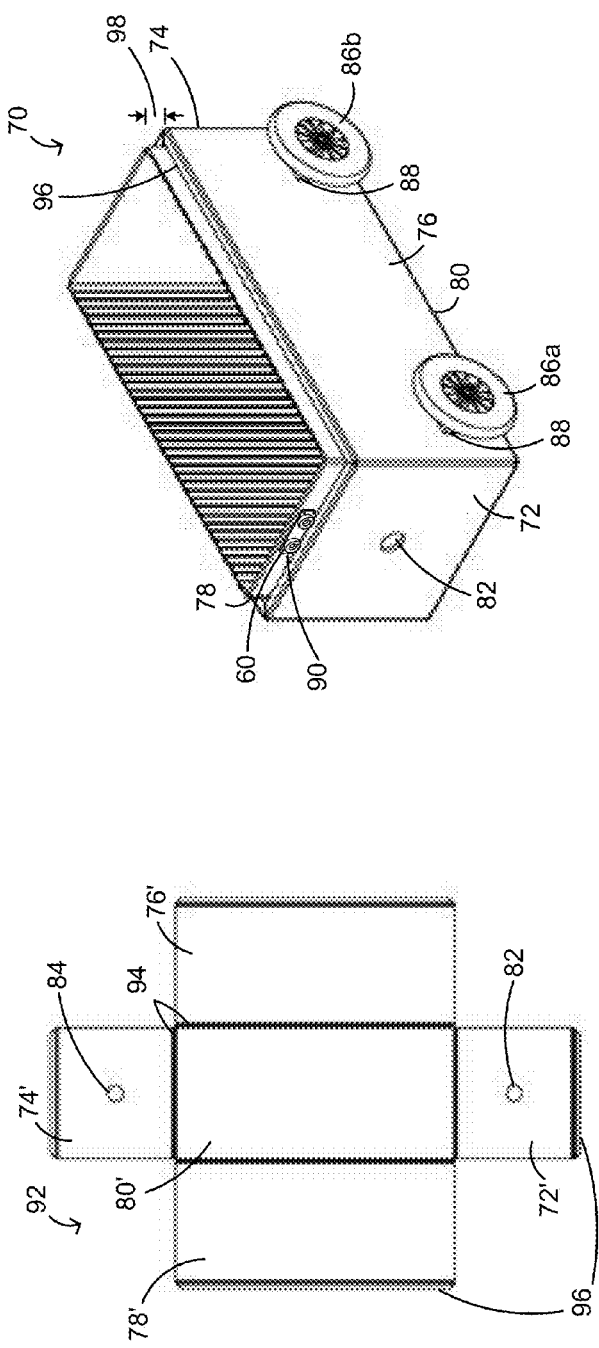
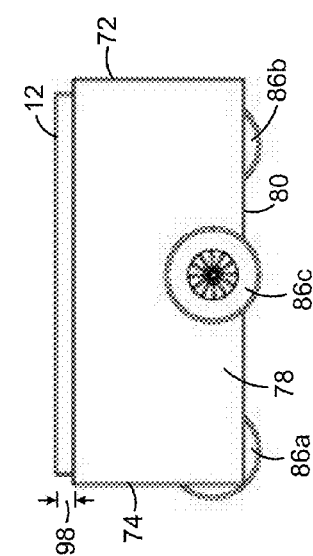
FIG. 4A
FIG. 4C
FIG. 4B

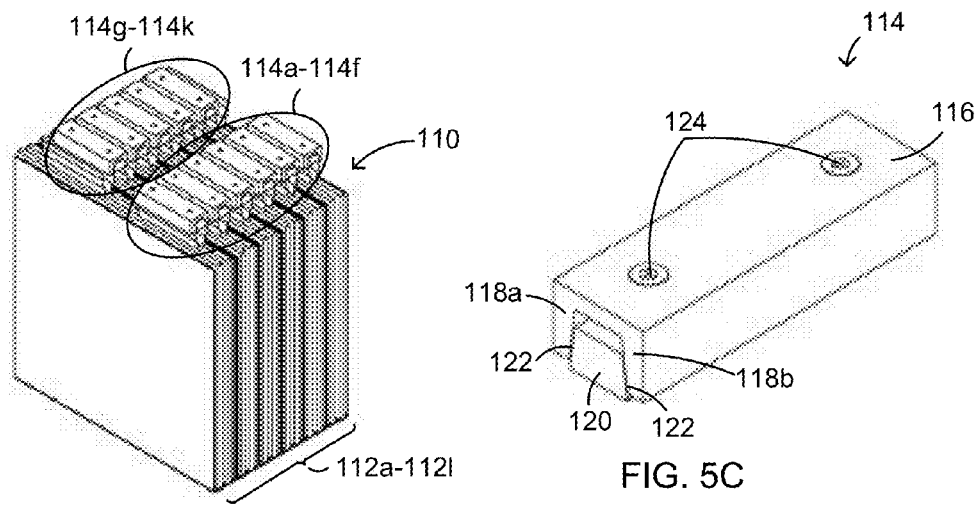
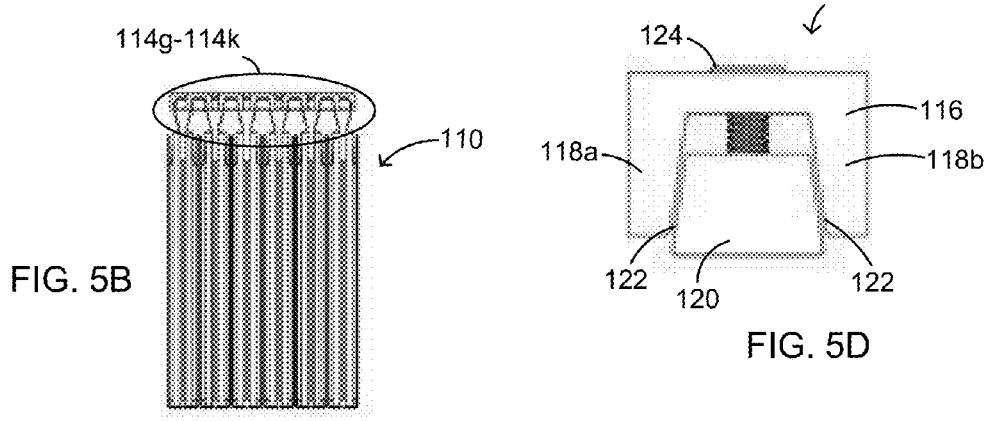
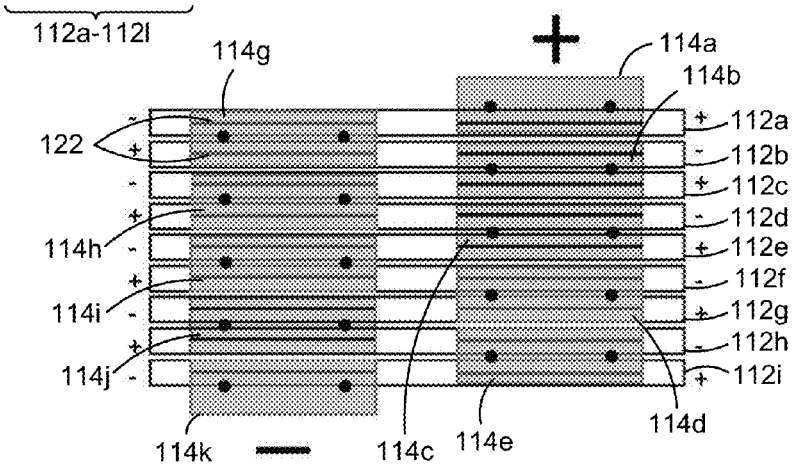

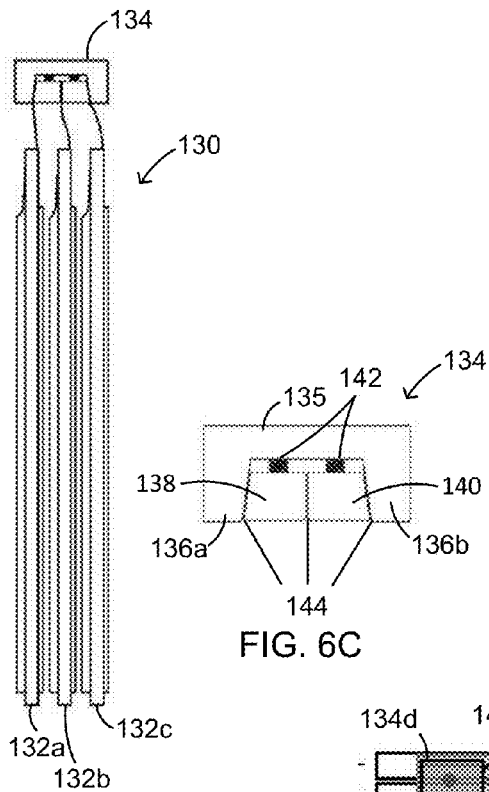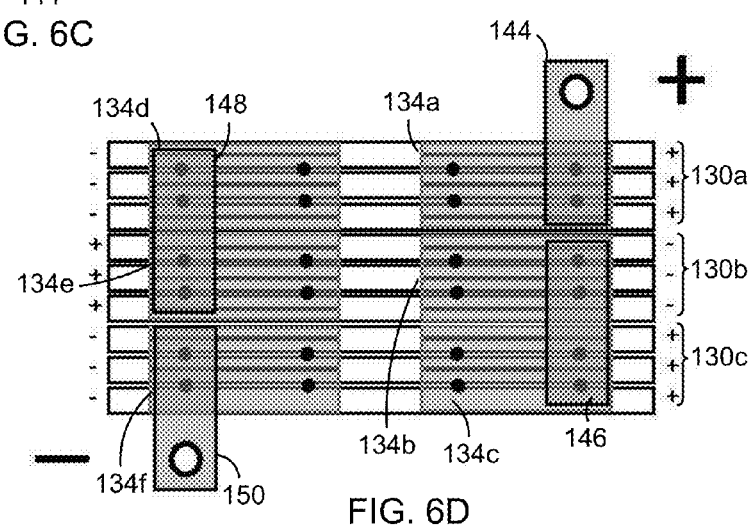
FIG. 6A
FIG. 6B
FIG. 6C
FIG. 6D

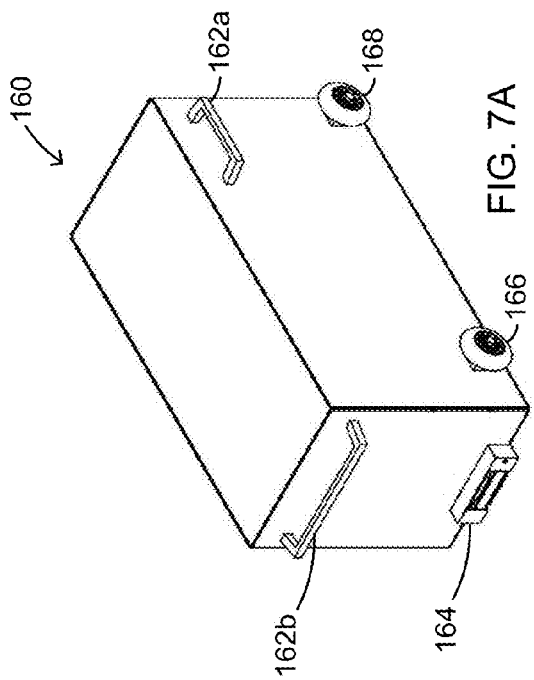
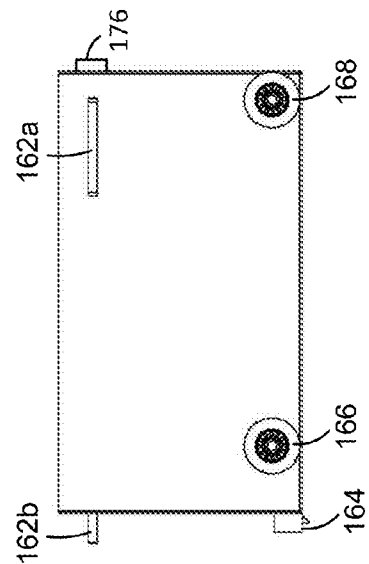
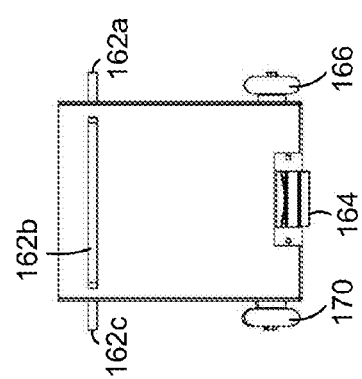
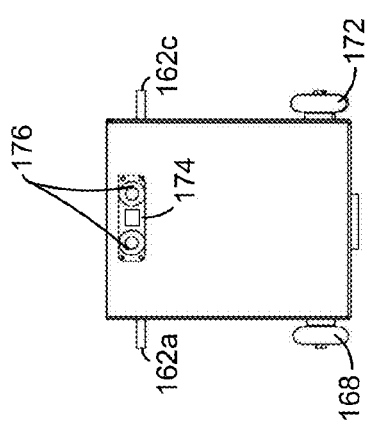
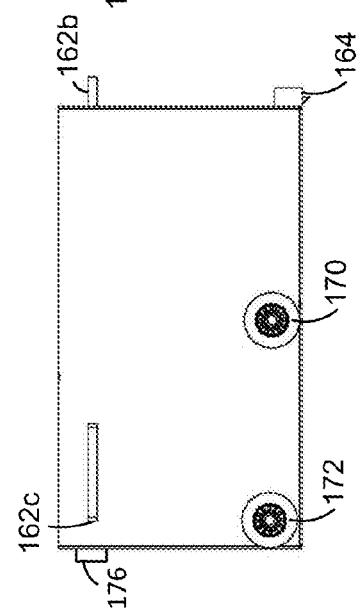

BATTERY PACK SYSTEM

FIELD

The various embodiments described herein generally relate to various components of a battery pack system that provides electric power during use.

BACKGROUND

Manufacturers of battery pack systems with electrochemical cells having substantially planar configurations typically manufacture the enclosures for these systems from plastic. The cells are usually hung from their electrical connections and surrounded by foam rings or shrink-wrap to hold them in place. In addition, the electrical connection to tabs of the cells is provided by a weld or solder. This mechanical configuration is not very stable as the cells may move during transport or operation which may result in a mechanical break and therefore electrical failure. Furthermore, for high power battery pack systems, the enclosure and materials that are typically used do not provide enough thermal dissipation which can result in the cells heating up, experiencing thermal runaway and becoming damaged. In addition, the electrical connection to the cell tabs via a weld or solder has an increased resistance and a small current pathway which results in increased current density which leads to increased heat generation during operation. While plastic battery pack enclosures maybe cost-effective to manufacture and plastic provides electrical isolation between the cells and the enclosure, a disadvantage is the poor thermal conductivity of plastic. This necessitates the use of external active cooling systems to facilitate heat dissipation. However, as a result, the overall system becomes expensive, bulky and difficult to manufacture.

SUMMARY OF VARIOUS EMBODIMENTS

In one aspect, in at least one embodiment described herein, there is provided a battery pack system for providing electric power during use. The battery pack system comprises at least one cell carrier assembly configured to provide electric current during use, the cell carrier assembly having a substantially planar configuration; and a battery pack enclosure for housing the at least one cell carrier assembly, the battery pack enclosure having at least one wall with at least one channel sized to receive an edge of the cell carrier assembly to maintain the at least one cell carrier assembly at a location within the battery pack enclosure and provide a thermal pathway during use.

In some embodiments, the battery pack enclosure comprises opposed side walls each having at least one channel opposite one another to receive opposing side edges of the cell carrier assembly and provide first and second thermal pathways during use.

In some embodiments, the battery pack enclosure also comprises a bottom wall having at least one channel aligned with the at least one channels of the opposed side walls to receive a bottom edge of the cell carrier assembly and provide a third thermal pathway during use.

In general, the at least one cell carrier assembly comprises a cell configured to provide the electric current; and a cell carrier disposed at one face of the cell to provide a mounting surface for mounting the cell, wherein the mounting surface provides a fourth thermal pathway during use.

In some embodiments, the cell carrier comprises upper and lower tabs that extend away from the mounting surface and are disposed to receive upper and lower edges of the cell, the lower tab being electrically insulated from the lower edge of the cell.

In some embodiments, the one face of the cell and the mounting surface of the cell carrier are adhesively bonded with a thermally conductive adhesive.

The cell carrier can be made from a metal, a ceramic, a thermal conductive plastic or a composite material thereof.

In some embodiments, the at least one cell carrier assembly comprises a second cell carrier disposed at a second face of the cell and having a thermal insulative coating on an exterior surface to provide thermal insulation for the cell from an adjacent cell carrier assembly.

In some embodiments, the battery pack system comprises at least two cell carrier assemblies and a thermal mat disposed between adjacent cell carrier assemblies to provide a thermal barrier therebetween.

In some embodiments, the battery pack enclosure is formed from a single sheet of material with grooves defining regions for a bottom wall, front and rear walls at opposite ends of the bottom wall and side walls at opposite sides of the bottom wall, wherein the grooves have angled edges that are configured to allow for bending of the front, rear and side walls with respect to the bottom wall during manufacture.

In some embodiments, the battery pack enclosure further comprises a lid and outer edges of the front, rear and side walls comprise an inner groove for releasably receiving outer edges of the lid.

In some embodiments, the battery pack enclosure comprises an end wall with an intake aperture and a side wall with at least one spacing member disposed along the side wall to define a lower air pathway between a bottom edge of the at least one cell carrier assembly and a bottom wall of the battery pack enclosure, wherein cool air enters the intake aperture and travels along the lower air pathway to provide air cooling for the at least one cell carrier assembly during use.

In some embodiments, the battery pack enclosure further comprises a baffle and a fan, wherein the baffle is disposed near the end wall having the intake aperture to separate the lower air pathway from an upper air pathway disposed along a top portion of the battery pack enclosure and the fan is mounted on the end wall having the intake aperture, wherein, during use, air receives heat from the at least one cell carrier assembly as it rises from the lower air pathway to the upper air pathway and is removed from the battery pack enclosure by the fan.

In some embodiments, the battery pack system further comprises a liquid cooled enclosure that surrounds the battery pack enclosure, the liquid cooled enclosure having front, rear and two opposed side walls having upper edges spaced apart from and adjacent to front, rear and two opposed side walls of the battery pack enclosure to define a liquid pathway between the battery pack enclosure and the liquid cooled enclosure, the liquid cooled enclosure further comprising intake and outlet apertures on separate walls, wherein during use a liquid supplied to the intake aperture to remove heat from the battery pack enclosure is removed from the outlet aperture.

In some embodiments, there are first and second wheels mounted near first and second end portions of a first side wall of the liquid cooled enclosure and a third wheel mounted to a mid-portion of a second side wall of the liquid cooled enclosure.

In some embodiments, the battery pack system comprises a plurality of cell carrier assemblies having cells with positive and negative tabs to provide positive and negative electrical connections and the battery pack system further comprises a plurality of connectors with moveable components to releasably engage tabs from different cells and provide electrical and mechanical coupling during use.

In some embodiments, a first connector comprises a body with sidewalls defining a channel therebetween, an engagement member and coupling elements to releasably secure a first tab of a first cell and a first tab of a second cell between the engagement member and the sidewalls of the first connector to provide an electrical connection between the first and second cells and a thermal heat sink for the first and second tabs in use.

In some embodiments, the first tab of the first cell and the first tab of the second cell have opposite polarities and the first connector provides a series electrical coupling between the first and second cells in use.

In some embodiments, the first tab of the first cell and the first tab of the second cell have similar polarities and are coupled by the first connector and wherein a second connector couples a second tab of the first cell and a second tab of the second cell having a similar but opposite polarity to the first tabs of the first and second cells, wherein the first and second connectors provide a parallel electrical coupling between the first and second cells in use.

In some embodiments, the sidewalls of the first connector are angled substantially less than 90 degrees and the engagement member and the tabs of the cells have complimentary angled edges.

The first connector can be made from metal to provide high thermal dissipation in use.

In some embodiments, a first connector comprises a body with first and second sidewalls defining a channel therebetween, first and second engagement members disposed within the channel and coupling elements to releasably secure a first tab of a first cell between the first sidewall and the first engagement member, a first tab of a second cell between the first and second engagement members and a first tab of a third cell between the second engagement member and the second sidewall, the first tabs having a similar polarity and wherein a second connector comprises a similar structure as the first connector to releasably secure second tabs of the first, second and third cells, the second tabs having a similar but opposite polarity as the first tabs, wherein during use the first and second connectors provide a parallel electrical connection between the first, second and third cells and a thermal heat sink for the first, second and third tabs.

In some embodiments, the plurality of connectors are configured to couple the plurality of cells into several groups of parallel cells, and the battery pack system further comprises bus bars, wherein a bus bar is configured to releasably couple a first connector of a first group of parallel cells with a second connector of a second group of parallel cells in a series or parallel electrical connection.

In some embodiments, the battery pack system further comprises a printed circuit board having electrical circuits that are electrically coupled to the at least one cell carrier assembly, the printed circuit board being mounted adjacent to a wall or lid of the battery pack enclosure to provide a thermal pathway during use.

In some embodiments, the battery pack system further comprises power and data connectors mounted on an exterior portion of the battery pack enclosure and electrically coupled to at least one of the printed circuit board and the at least one cell carrier assembly.

In some embodiments, the battery pack system further comprises first and second wheels mounted near first and second end portions of a first side wall of the battery pack enclosure and a third wheel mounted to a mid-portion of a second side wall of the battery pack enclosure.

In some embodiments, the battery pack system further comprises a fourth wheel mounted near an end portion on the second side wall of the battery pack enclosure, the fourth wheel having a bottom edge that is higher than a bottom edge of the first second and third wheels and lower than a bottom wall of the battery pack enclosure, wherein the first, second and third wheels are configured to be load-bearing wheels.

The battery pack enclosure can be made of metal.

In some embodiments, the battery pack system further comprises an interlock latch mounted on an exterior portion of the battery pack enclosure to secure the battery pack enclosure at a fixed location.

The interlock latch comprises a latch housing, a lever slidably mounted to the latch housing and a striker coupled to the lever, wherein the lever and striker are moveable between a first position in which the striker is disposed within the latch housing and a second position in which the striker extends vertically away from the latch housing to engage a slot on an external fixed element to secure the battery pack enclosure in the fixed location.

In another aspect, in at least one embodiment described herein, there is provided a battery pack system for providing electric power during use. The battery pack system comprises at least one cell carrier assembly having a substantially planar configuration and comprising a cell configured to provide electric current during use, the cell having tabs to provide positive and negative electrical connections and a cell carrier disposed at one face of the cell to provide a mounting surface for mounting the cell; at least one pair of connectors to releasably apply a compressive force to one of the tabs of the cell and provide electrical coupling during use; and a battery pack enclosure for housing the at least one cell carrier assembly.

In another aspect, in at least one embodiment described herein, there is provided a battery pack rack assembly for housing a plurality of battery pack enclosures of battery pack systems. The battery pack rack assembly comprises a frame having a rectangular structure; and at least one platform supported within the frame, the at least one platform having a plurality of indexing rails grouped in pairs, an engagement rail having a plurality of slots and mounted generally perpendicular to the plurality of indexing rails at a front portion of the at least one platform, and a power rail mounted generally parallel to the engagement rail at a rear portion of the at least one platform, wherein each of the pair of indexing rails are spaced apart to slidably receive a given battery pack enclosure and a corresponding slot on the engagement rail is configured to receive a locking mechanism of the given battery pack enclosure to maintain the given battery pack enclosure at a fixed location.

In some embodiments, each side wall of the given battery pack enclosures comprises a wheel and the pair of indexing rails have a channel configuration to receive the wheels of the given battery pack enclosure.

The power rail comprises a plurality of slots to allow access to data and power connectors of the battery pack enclosures.

In another aspect, in at least one embodiment described herein, there is provided a battery pack system for providing electric power during use. The battery pack system comprises a plurality of cell carrier assemblies configured to provide electric current during use, each cell carrier assembly having a substantially planar configuration and comprising a cell carrier and a cell that is mounted to the cell carrier, the cell having positive and negative tabs to provide positive and negative electrical connections and the cell carrier providing a thermal pathway during use; a plurality of connectors to releasably couple to tabs from different cells and provide electrical coupling during use; a battery pack enclosure for housing the plurality of cell carrier assemblies, the battery pack enclosure comprising opposed side walls each having channels opposite one another to receive opposing side edges of the cell carrier assemblies and provide additional thermal pathways during use; and a printed circuit board having electrical circuits to provide a battery management system that is electrically coupled to the plurality of cell carrier assemblies to monitor operation thereof in use, the printed circuit board being mounted adjacent to a wall or lid of the battery pack enclosure to provide another thermal pathway during use.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and in which:

FIG. 1B is a magnified view of a bottom wall of a battery pack enclosure;

FIG. 3A is a top view of an example embodiment of a sheet that can be used in the construction of an enclosure for a battery pack system;

FIG. 3B is a perspective view of an enclosure made from the sheet of FIG. 3A;

FIG. 3C is a perspective view of a lid for the enclosure of FIG. 3B;

FIG. 3D is a cross-sectional view showing a carrier cell assembly placed within the enclosure of FIG. 3B;

FIG. 3E is an exploded top view of a portion of the sheet of FIG. 3A;

FIG. 3F is a side view of the portion of the sheet of FIG. 3E;

FIG. 3G is an end view of the portion of the sheet of FIG. 3E;

FIG. 4A is a perspective view of an alternative embodiment of a battery pack system comprising a liquid cooled enclosure with a lid removed for ease of illustration;

FIG. 4B is a top view of an example embodiment of a sheet that can be used to manufacture a liquid cooled enclosure;

FIG. 4C illustrates a side view of the battery pack system and liquid cooled enclosure of FIG. 4A;

FIG. 5A is a perspective view of an example embodiment of a series configuration of cells that can be used in a battery pack system;

FIG. 5B is a side view of the series configuration of cells of FIG. 5A;

FIG. 5C is a perspective view of a connector that can be used with the series configuration of cells of FIG. 5A;

FIG. 5D is an end view of the connector of FIG. 5C;

FIG. 5E is a top view of the series configuration of cells of FIG. 5A;

FIG. 6A is a side view of an example embodiment of a parallel connection of cells that can be used in a battery pack system;

FIG. 6B is a perspective view of a connector that can be used with the parallel configuration of cells of FIG. 6A;

FIG. 6C is an end view of the connector of FIG. 6B;

FIG. 6D is a top view of a series-parallel configuration of cells that can be used in a battery pack system;

FIG. 7A is a perspective view of another example embodiment of a battery pack enclosure;

FIG. 7B is a side view of the battery pack enclosure of FIG. 7A;

FIG. 7C is another side view of the battery pack enclosure of FIG. 7A;

FIG. 7D is an end view of the battery pack enclosure of FIG. 7A;

FIG. 7E is another end view of the battery pack enclosure of FIG. 7A;

DETAILED DESCRIPTION OF THE EMBODIMENTS

Figure 1A:
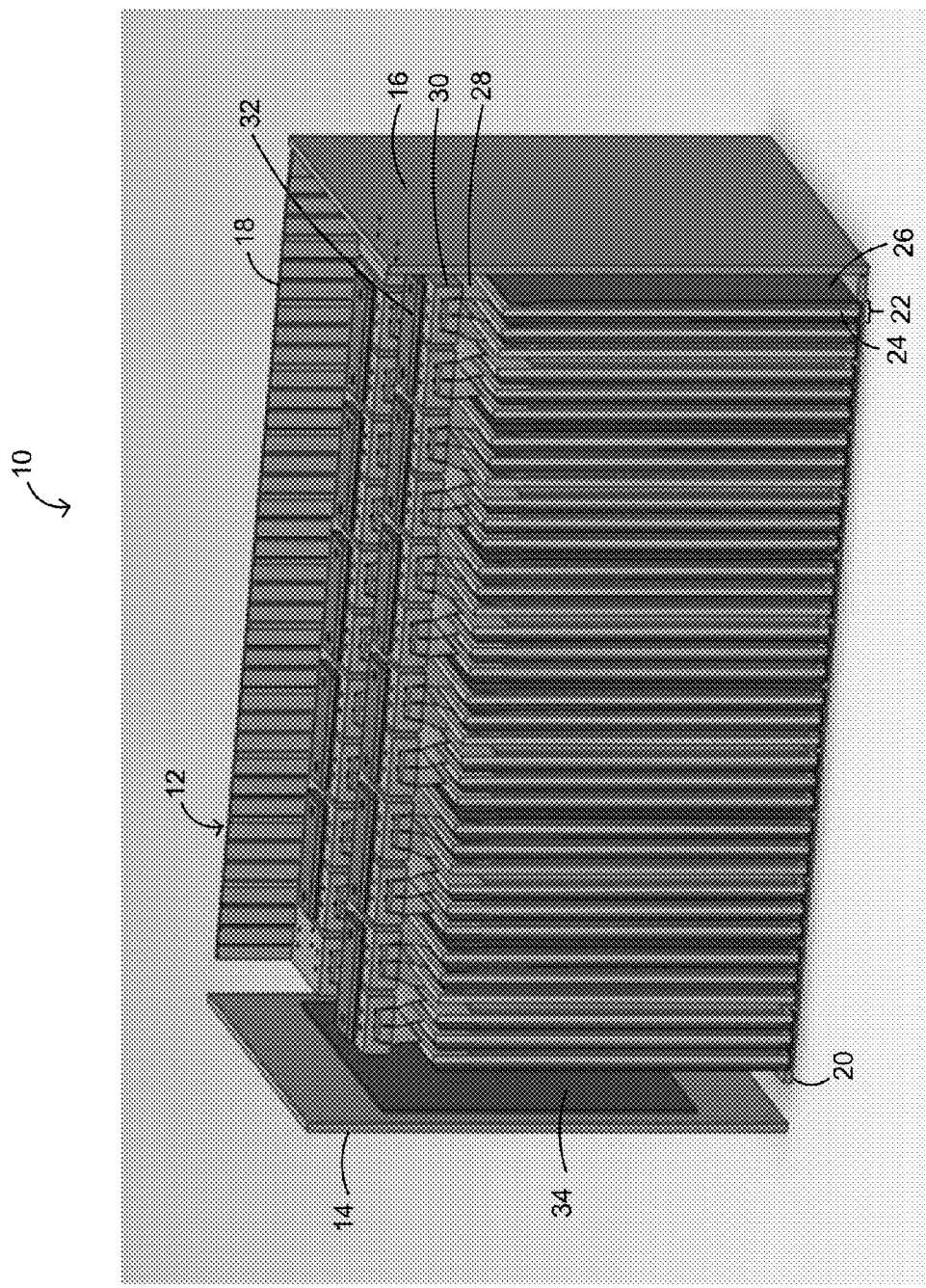
FIG. 1A is a perspective view of an example embodiment of a battery pack system with a lid and sidewall removed for ease of illustration.

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses or processes described below. It is possible that an apparatus or process described below is not an embodiment of any claimed invention. Any invention disclosed in an apparatus or process described below that is not claimed in this document may be the subject matter of another protective instrument, for example, a continuing patent application, and the applicant, inventor or owners do not intend to abandon, disclaim or dedicate to the public any such invention by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Referring now to FIG. 1A, shown therein is a perspective view of an example embodiment of a battery pack system 10. The battery pack system 10 is used to provide electric power during use. As illustrated, the battery pack system 10 comprises a battery pack enclosure 12 that houses a plurality of cell carrier assemblies 22 (only one of which is labeled for simplicity). The battery pack enclosure 12 maintains or indexes the plurality of cell carrier assemblies 22 at certain locations within the battery pack enclosure 12. Each cell carrier assembly 22 comprises a cell 24 having a substantially planar configuration and a cell carrier 26. The cell 24 is configured to provide electric current and can be a large format lithium cell. In other embodiments, other chemical cells can be used as the cell 24 such as Lithium Ion, Lithium Iron Phosphate, Lithium Titanate, Manganese Spinal and Nickel Cobalt Aluminum electrochemical cells, for example.

In different embodiments, the battery pack system 10 may comprise any number of cell carrier assemblies 22, such as one cell carrier assembly, two cell carrier assemblies, twelve cell carrier assemblies or more for example. The cell carrier assemblies 22 may be coupled in the battery pack enclosure 12 in various configurations, such as, in series, in parallel or a combination of series and parallel. The cell carrier assemblies 22 shown in FIG. 1A comprise a series connection of a plurality of parallel-connected cells. The series and parallel configuration of cells will be discussed in more detail with respect to FIGS. 5A-5E and FIGS. 6A-6D, respectively.

A cell carrier 26 is disposed at one face of the cell 24 and configured to provide a mounting surface for mounting the cell 24. The cell carrier 26 is made from a thermally conductive material, such as, for example, a metal like Copper, Aluminum, Aluminum Nitride, ceramics, thermal conductive plastics, Copper Invar Clad and composite materials. Accordingly, the mounting surface provides a thermal pathway for heat dissipation during cell use. The battery pack enclosure 12 is also manufactured from a thermally conductive material such as Aluminum, thermal conductive plastics and thermal conductive composites, for example, and accordingly provides a thermal pathway for heat dissipation when the battery pack system 10 is in use. The cell carrier 26 allows for the accurate placement and spacing between adjacent cells in the battery pack enclosure 12.

As illustrated, the battery pack system 10 comprises a plurality of cell carrier assemblies 22, with each cell 24 having positive and negative tabs 28 to provide positive and negative electrical connections. The battery pack system 10 comprises a plurality of connectors 30 to releasably couple the positive and negative tabs 28 from different cells 24 and provide electrical and mechanical coupling during use.

In some embodiments, the connectors 30 coupling the tabs 28 are releasably coupled to each other. The plurality of connectors 30 may also be releasably coupled to one another using connectors 32, such as, for example, bus bars. The releasable coupling of the positive and negative tabs 28 of the cells 24 to the connectors 30 and of the various connectors 30 to the connectors 32 facilitates the disconnecting, removing or replacing of a cell 24 or a cell carrier assembly 22 from the battery pack enclosure 12 upon cell failure without affecting the functionality of the other cells 24 or cell carrier assemblies 22 that are not damaged.

As illustrated in FIG. 1A, the battery pack enclosure 12 comprises a front wall 14, a rear wall 16, a bottom wall 20, a first side wall 18 and a second side wall (not shown). In some embodiments, depending on the size of the cell carrier assembly 22 it may be possible to have only one wall of the battery pack enclosure 12 with channels, where each channel is sized to receive an edge of each cell carrier assembly 22 and provide enough structural support to maintain the cell carrier assemblies 22 at certain locations within the battery pack enclosure 12. For example, only the first side wall 18 may have channels for receiving the cell carrier assemblies 22. In other embodiments, the second side wall (not shown in FIG. 1A) has channels for receiving the cell carrier assemblies 22. In other embodiments, the bottom wall 20 has channels for receiving the cell carrier assemblies 22.

In some embodiments, two walls of the battery pack enclosure 12 have channels for receiving the cell carrier assemblies 22. For example, both the first side wall 18 and the bottom wall 20 can have multiple channels for receiving the cell carrier assemblies 22. In such embodiments, the channels of the first wall, such as, for example, the first side wall 18 are aligned with the channels of the second wall, such as, for example, the bottom wall 20. Accordingly, each channel of the first side wall 18 and a correspondingly aligned channel of the bottom wall 20 receive different edges of the cell carrier assembly 22. In another example, the first side wall 18 and the second side wall have channels opposite one another to receive side edges of the cell carrier assembly 22.

In some embodiments, the first side wall 18, the bottom wall 20 and the second side wall have channels for receiving the cell carrier assembly 22. In such embodiments, the channels of the first side wall 18, the bottom wall 20 and the second side wall are aligned to receive different edges of the cell carrier assemblies 22, where the first side wall 18 and the second side wall receive the opposite edges of the cell carrier assembly 22 and the bottom wall 20 receives the bottom edge of the cell carrier assembly 22.

The battery pack enclosure 12 may include any number of channels, such as, for example, one channel, two channels or twelve channels where the number of channels are greater than or equal to the number of cell carrier assemblies 22 that are to be housed within the battery pack enclosure 12.

Referring now to FIG. 1B, shown therein is a magnified view of the bottom wall 20 of an enclosure having channels 42 that are defined by ridges or ribs 42r. The channels 42 are sized to receive one edge of the cell carrier assembly 22; in this case a lower portion of the cell carrier 26. The ribs 42r of the channels can be sized to be a bit larger that the width of the cell carrier assembly to allow for expansion due to the heat that is generated during operation.

Referring again to FIG. 1A, the battery pack system 10 also comprises a printed circuit board 34, which has electrical circuits to provide a battery management system. The battery management system is electrically coupled to the cell carrier assemblies 22 to monitor operation of the battery pack system 10 in use. For example, a battery management system monitors cell voltages to determine if the cells 24 are balanced during use.

During operation of the battery pack system 10, if the voltages of the various cells 24 diverge from one another, the overall capacity of the battery pack system 10 suffers. A common way to compensate for voltage imbalance, especially in large format battery cells, is to increase the balancing current of the cells 24. However, the increase in the balancing current introduces more heat within the battery pack system 10. This tends to heat up the printed circuit board 34. An advantage of mounting the printed circuit board 34 adjacent to a wall of the battery pack enclosure 12 is to provide a thermal pathway for heat dissipation for the printed circuit board when the battery pack system 10 is in use and especially, when balancing current is introduced to balance the battery pack system 10.

The printed circuit board 34 is mounted to the front wall 14. In some embodiments, the printed circuit board 34 can be mounted to the rear wall 16, a side wall 18 or a lid of the battery pack enclosure 12. The printed circuit board 34 may be mounted to the battery pack enclosure 12 walls using a thermally conductive bond or film for more efficient heat dissipation.

Referring now to FIGS. 2A-2F, shown therein is an example embodiment of a cell carrier assembly 22. The cell carrier assembly 22 comprises a cell 24 and a cell carrier 26. The cell 24 is generally an electrochemical cell that comprises an anode 24a, a cathode 24c and an electrolyte layer 24b, and each cell 24 has positive and negative tabs 28 to provide positive and negative electrical connections.

The cell carrier 26 may be manufactured from any thermally conductive material, such as, for example, Aluminum, Copper, Copper invar clad, Aluminum Nitride, ceramics, thermal conductive plastics and composite materials. The cell carrier 26 can have a thickness on the order of millimeters depending on the particular application and size of the cell 24. The cell carrier 26 comprises upper tabs 26a and a lower tab 26b, where the upper tabs 26a are disposed to receive the upper edge of the cell 24 and the lower tab 26b is disposed to receive the lower edge of the cell 24 during mounting. The upper 26a and lower 26b tabs extend away from the mounting surface of the cell carrier 26 and help to maintain the cell 24 in position against the cell carrier 26. In some embodiments, there may be some clearance between the tabs 26a and 26b and the upper and lower edges, respectively, of the cell 24 to allow for thermal expansion of the cell 24 during use. In some embodiment, the tabs 26a and 26b may not be used.

Figure 2A:
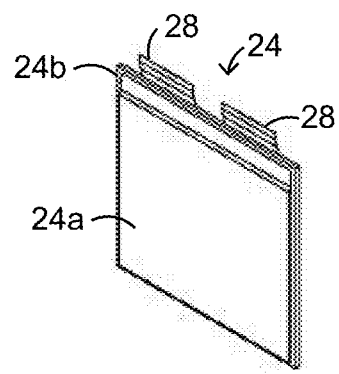
FIG. 2A is a perspective view of an example embodiment of a cell.
Figure 2B:
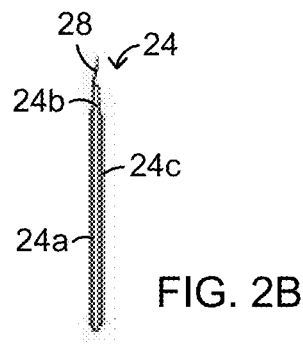
FIG. 2B is a side view of the cell of FIG. 2A.
Figure 2C:
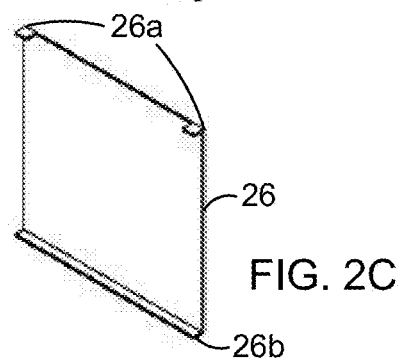
FIG. 2C is a perspective view of an example embodiment of a cell carrier.
Figure 2D:
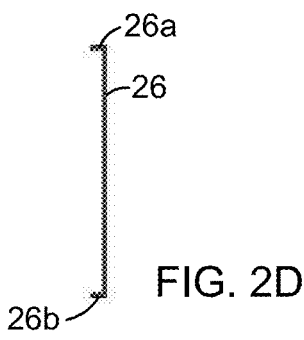
FIG. 2D is a side view of the cell carrier of FIG. 2C.
Figure 2E:
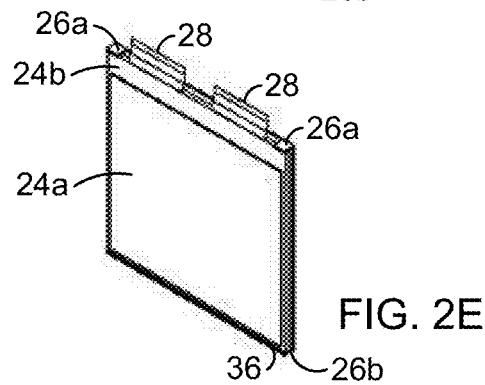
FIG. 2E is a perspective view of an example embodiment of a cell carrier assembly.
Figure 2F:
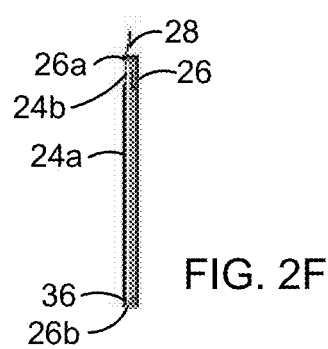
FIG. 2F is a side view of the cell carrier assembly of FIG. 2E.

In the example embodiment illustrated in FIG. 2C, two upper tabs 26a are provided close to either corners of the mounting surface of the cell carrier 26. The upper tabs 26a may be bent at 90 degrees or any angle close to 90 degrees to receive the upper edge of the cell 24. In some other embodiments, the upper tab 26a consists of more than two tabs.

In the example embodiment illustrated in FIG. 2C, the lower tab 26b comprises a perpendicular bend at the bottom of the cell carrier 26. The lower tab 26b may be bent at 90 degrees or any angle close to 90 degrees to receive the lower edge of the cell 24. Even though the lower tab 26b is illustrated as a continuous surface, there may be embodiments in which the lower tab 26b is a discontinuous surface and may comprise two or more tabs that are separated from each other.

The lower tab 26b of the cell carrier 26 also facilitates the prevention of short circuiting around the lower edges of the cells 24 and the bottom wall of the enclosure 12. This is accomplished by bonding the lower tab 26b of the cell carrier 26 to the lower edge of the cell 24 using a thermally conductive but electrically insulating material 36. This can be accomplished via an adhesive bonding agent. For example, the lower tab of the cell carrier 26 may be bonded to the lower edge of the cell 24 using a thermally conductive bonding agent such as a room temperature vulcanizing bonding agent, for example.

It should also be noted that the cell carrier 26 provides a thermal pathway for the heat that is generated by the cell 24 during use since one face of the cell is disposed adjacent to a face of the cell carrier 26. To further promote heat dissipation, the face of the cell 24 adjacent to the face of the cell carrier 26 can be bonded to the cell carrier 26 using a thermally conductive bonding agent.

The cell carrier 26 is also made to have a certain thickness that allows for some expansion due to the heat that is generated during use. This provides for a more robust operation of the components of the battery pack enclosure since there is some components are allowed to move slightly due to the generation of heat.

To further promote increased heat dissipation, in alternative embodiments, a cell carrier assembly can include two cell carriers that are placed on either side of a cell to provide a double-cell carrier configuration. Accordingly another cell carrier can be placed on the other side of the cell (i.e. facing the anode 24a shown in FIG. 2E). This can be done with a minor offset using the shape of the cell carrier 26 shown in FIG. 2C such that the tabs of one of the cell carriers stacks on top of the tabs of the other cell carrier. This is advantageous in cases of thermal runaway where a cell becomes faulty and generates a large amount of heat. In these cases, the use of cell carriers on either side of the cell allows for a greater amount of heat to be transferred away from the faulty cell so that the heat does not spread so easily to adjacent cells. This double-cell carrier configuration also provides insulation against cells that experience thermal runaway. This is important since when a cell goes into thermal runaway, and outgasses through a valve in the battery pack enclosure, the double-cell carrier configuration prevents heat and flame from that cell impinging on adjacent cells. To further aid in providing thermal insulation between adjacent cells, the surface of a cell carrier 26 that is not adjacent to a cell can be coated with a thermal insulative coating such as a ceramic or a thermal barrier material.

In some embodiments, a thermal mat can also be placed in between the cell carrier assemblies to provide a thermal barrier between the cell carrier assemblies. In these cases, the cell can be mounted or thermally bonded to one face of the cell carrier and the thermal mat can be mounted or thermally bonded to the other face of the cell carrier. This is also advantageous in cases of thermal runaway where a cell becomes damaged and generates a large amount of heat since the thermal mat can provide insulation such that different faces of the thermal mat are at different temperatures. For example, one face of the thermal mat can be at 100 degrees Celsius while the other face of the thermal mat can be at 1,000 or 1,200 degrees Celsius. Accordingly, the use of the thermal mat provides isolation for cells that experience thermal runaway. Examples of materials that can be used for the thermal mat include ceramics and ceramic coating, Zirconates, Temprol®, Armatex®, Cermex®, HVtex®, Siltex®, Thermopak® and composites.

Figure 3H:
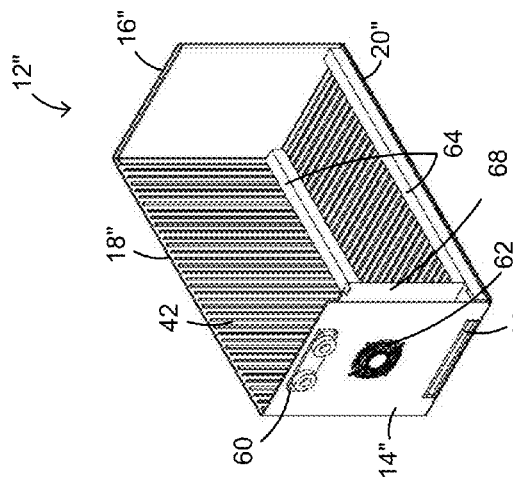
FIG. 3H is a perspective view of another example embodiment of an enclosure for a battery pack system with a lid and one side wall removed for ease of illustration.
Figure 3I:
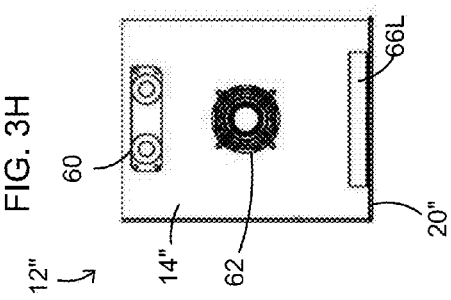
FIG. 3I is an end view of the enclosure of FIG. 3H

Referring now to FIGS. 3A-3K, shown therein is an example embodiment of a battery pack enclosure 12'. As illustrated in FIG. 3A, the battery pack enclosure 12' may be formed from a single sheet 40 of material. The sheet 40 may be any metallic material or alloy with good thermal dissipation properties. For example, the sheet 40 may be made from forged and cold-rolled or pressure-rolled plate Aluminum or cast and extruded Aluminum. These materials generally provide 3 times the heat dissipation of materials (such as various plastics) that are conventionally used in battery pack enclosures.

The sheet 40 further comprises channels 42 for receiving and indexing or maintaining each cell carrier assembly 22 at a certain location within the battery pack enclosure 12'. The sheet 40 also comprises groves 46 that are configured to allow the sheet 40 to be formed into a substantial portion of the battery pack enclosure 12'. The sheet 40 and groves 46 define regions for a bottom wall 20', a front wall 14', a rear wall 16', a first side wall 18' and a second side wall 44. The groves 46 allow for bending of the front wall 14', rear wall 16' and side walls 18' and 44 with respect to the bottom wall 20' during the manufacturing or assembly of the battery pack enclosure 12'. Once the portions of the sheet 40 that define the front wall 14', rear wall 16' and side walls 18' and 44 are bent such that the edges of the adjacent walls are substantially vertical and proximal to one another, the edges of the walls are welded together.

The edges of the groves 46 are at an angle such that the front wall 14', rear wall 16' and side walls 18', 44 can be accurately and repeatably bent to provide the battery pack enclosure 12'. For example, as illustrated in FIGS. 3E and 3F, the groves 46 are provided at an angle close to 43 degrees, with respect to the plane of the sheet 40, to take into account the need to provide additional angular clearance so that the second side wall 44 can be accurately bent upwards to form an angle close to 90 degrees with respect to the bottom wall 20' and so that the channels 42 from the second side wall 44 and the bottom wall 20' are aligned. The groves 46 are also spaced apart (see FIG. 3F) to allow for bending clearance so as not to stretch the outer part the bend which would otherwise create cracks in the seam. The angle of the groves 46 can change depending on the material that is used for the sheet 40, such as T3, T4 or T6 Aluminum, for example.

Using a single sheet of a thermally conductive material, such as the sheet 40, for manufacturing the battery pack enclosure 12' is cost-effective as it allows for sourcing or selecting a sheet material and machining of channels and groves in the sheet material in a series of simple operations that can be done relatively inexpensively. The sheet thus prepared can be shipped in bulk to the manufacturing or assembly site. The sheets can later be bent and joined or welded together to provide the battery back enclosure 12'.

In some alternative embodiments, the battery pack enclosure 12' is formed using separate components instead of one sheet of thermally conductive material 40. For example, each of the bottom wall 20, the front wall 14, the rear wall 16 and the side walls 18 and 44 may be separate pieces that are fastened together to form the battery pack enclosure 12'.

Referring now to FIG. 3B, shown therein is a battery pack enclosure 12' with the bottom wall 20', the front wall 14', the rear wall 16' and the side walls 18', 44 welded together. The seams along the front 14', rear 16' and side walls 18', 44 may be fillet welded with a low cost metal inert gas (MIG) welding process.

Referring now to FIG. 3C, the battery pack enclosure 12' also comprises a lid 52 to provide a top wall of the battery pack enclosure 12'. In some embodiments, the front wall 14', rear wall 16' and side walls 18' and 44 comprise groves 48 along their outer edges, as illustrated in FIG. 3A, to releasably receive the outer edges of the lid 52. The inner groves 48 may be at an angle, such as 90 degrees for example, to receive the lid 52 as an insert into the outer edges of the front wall 14', rear wall 16' and side walls 18' and 44. A sealing element such as an O-ring may be used to provide an air-tight seal between the lid 52 and the battery pack enclosure 12'.

In some embodiments, the front wall 14', rear wall 16' and side walls 18' and 44 do not comprise inner groves 48, and the lid 52 may be releasably fastened to the battery pack enclosure 12' by using latches or screws, for example. The sealing element may also be used to provide an air-tight seal.

Referring now to FIG. 3D, shown therein is a cross-sectional view of the battery pack enclosure 12' showing the anode 24a and tabs 28 of a given cell 24. The cell 24, along with the corresponding cell carrier 26, are enclosed by the first and second side wall 18' and 44, and the bottom wall 20'. The cell carrier 26 and the walls 18', 44 and 20' of the battery pack enclosure 12' passively cool the cell 24 by providing passive heat sinks and thermal pathways for heat dissipation during operation. There is also a gap 54 at the top of the cell 24 but below the top of the first and second side walls 18' and 44 where the lid 52 is placed which provides another thermal pathway for the heat that is generated by the cell 24 during operation.

Referring now to FIGS. 3H-3K, shown therein is an alternative embodiment of a battery pack enclosure 12" that is actively cooled by using an active airflow. Active air cooling can be used when a passively cooled pack does not meet the thermal loading requirements of a particular design and liquid cooling is not required. In this example embodiment, the battery pack enclosure 12" is built with higher side and end walls to provide for additional spacing at the top of the cells to allow the cells to be mounted higher. The battery pack enclosure 12" comprises components and a certain configuration to provide active air cooling.

The battery pack enclosure 12" comprises a fan 62 and an opening or an intake aperture 66 for receiving cool air. The fan 62 and/or the opening 66 may be provided on any one or both of the front 14" and rear 16" walls. The battery pack enclosure 12" also comprises data and power connectors 60. The data and power connectors 60 are typically mounted on the same wall as the printed circuit board 34 but may be mounted on another wall in some cases. In this example embodiment, the fan 62, the data and power connectors 60 and the intake aperture 66 for receiving cool air are all provided on the front wall 14" of the battery pack enclosure 12".

Figure 3J:
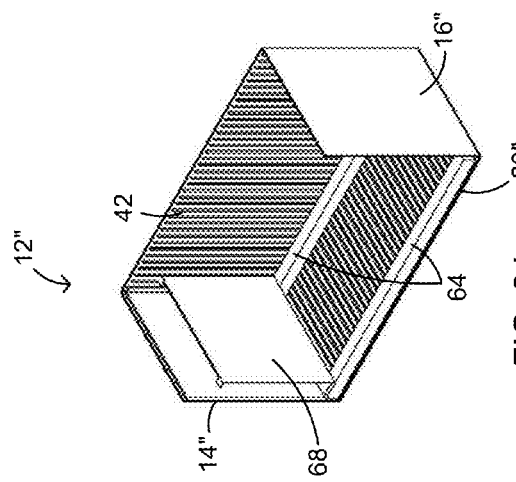
FIG. 3J is another perspective view of the enclosure of FIG. 3H.
Figure 3K:
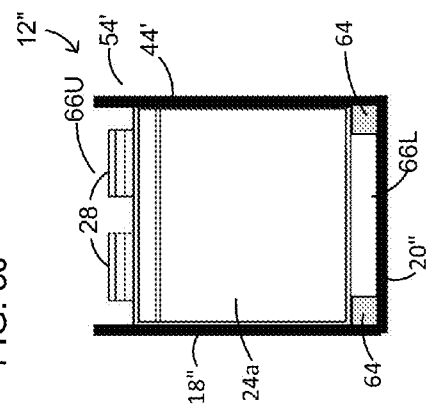
FIG. 3K is a cross-sectional view showing a carrier cell assembly placed within the enclosure of FIG. 3H.

The battery pack enclosure 12" also comprises at least one spacing member 64 and a baffle 68 as illustrated in FIGS. 3H, 3J and 3K. The spacing members 64 are disposed along the side walls 18" and 44 (not shown) to define a lower air pathway 66L between a bottom edge of the cell carrier assemblies 22 and a bottom wall 20" of the battery pack enclosure 12". Accordingly, the intake aperture 66 provides a passage for cool air to enter into the battery pack enclosure 12" and the spacing members 64 provide the lower air pathway 66L for the cool air to travel underneath the cell carrier assemblies 22 to cool the cells 24 during operation. In this example embodiment, the spacing members 64 are rectangular blocks that can be made of plastic. Alternatively, the spacing members 64 can be made from a material with better heat dissipation properties than plastic such as metal. In alternative embodiments, the spacing members 64 can be provided by shoulders or horizontal ribs that extend from the side walls 18" and 44.

The baffle 68 is disposed near the front wall 14", as illustrated in FIGS. 3H and 3J. The baffle 68 is disposed on the same side as the fan 62. The baffle 68 is configured to separate the lower air pathway 66L from an upper air pathway 66U above the cell carrier assemblies 26 and disposed along a top portion of the battery pack enclosure 12". The baffle 68 can be made from aluminum or another suitable material.

Referring now to FIG. 3K, the battery pack enclosure 12" encloses the cell carrier assembly 22 by the first and second side walls 18" and 44', and the bottom wall 20". The cell carrier assembly 22 is supported on the spacing members 64 to define the lower air pathway 66L but the top of the first and second side walls 18" 44' define a second height 54' that provides an upper air pathway 66U between the tops of the carrier cell assemblies 22 and the top of the battery pack enclosure 12". The upper air pathway 66U leads to the space between the baffle 68 and the front wall 14" upon which the fan 62 is mounted.

During operation, cool air enters the intake aperture 66 and travels along the lower air pathway 66L underneath the cell carrier assemblies 22. This cool air is then heated by the heat generated by the cells 24 and rises between the cell carrier assemblies 22 up to the upper air pathway 66U. The fan 62 then draws the heated air along the upper air pathway 66U to the other side of the baffle 68 facing the inner portion of the wall 14" at which point the fan 62 draws the hot air to the outside of the battery pack enclosure 12" thereby aiding with the removal of heat that is generated during operation, which acts to cool the cells 24 to prevent failure and to allow the cells 24 to operate for a longer duration of time.

Referring now to FIGS. 4A-4C, shown therein is an example embodiment of a liquid cooled enclosure 70. The liquid cooled enclosure 70 is configured to house a battery pack enclosure 12 and facilitate active cooling of the battery pack enclosure 12 using a cooling liquid. The liquid cooled enclosure 70 comprises a front wall 72, a rear wall 74 (which can also be referred to as end walls 72 and 74), opposite side walls 76 and 78, and a bottom wall 80 for surrounding the battery pack enclosure 12. The end walls 72 and 74 and opposed side walls 76 and 78 have upper edges spaced apart from and adjacent to the front wall 14, the rear wall 16, the first side wall 18 and the second side wall of the battery pack enclosure 12 to define a liquid pathway between the battery pack enclosure 12 and the liquid cooled enclosure 70.

In some embodiments, as illustrated in FIG. 4B, the liquid cooled enclosure 70 is formed from a single sheet of material 92. The sheet 92 may be any material, such as a metal, an alloy, a suitable plastic, Aluminum, copper, and metal and/or plastic composites, for example, that can withstand the combined weight of the battery pack enclosure 12 and liquid cooling material used for active liquid cooling. For example, the sheet 92 may be a flat aluminum plate.

The sheet 92 defines regions for side walls 78' and 76', end walls 72' and 74' and bottom wall 80'. The sheet 92 further comprises groves 94 configured to allow for the bending of certain portions to form the side walls 78' and 76' and end walls 72' and 74' to provide the liquid cooling enclosure 70. For example, the groves 94 may be at an angle close to 44 degrees so that the side walls 78' and 76' and the end walls 72' and 74' can be bent at an angle close to 90 degrees and then welded together to provide the liquid cooled enclosure 70.

The liquid cooled enclosure 70 is configured so that the side walls 76 and 78 and end walls 72 and 74 have a height that is lower than the walls of the battery pack enclosure 12 as illustrated by reference 98 in FIGS. 4A and 4C. This clearance region 98 allows for the power and data connectors 60 to be located on the battery pack enclosure 12 without any manufacturing modifications when using the battery pack enclosure 12 with the liquid cooled enclosure 70. The clearance region 98 is also advantageous since it ensures that any assembly error or other distortion related to the liquid cooled enclosure 70 does not transition to the top of the battery cell enclosure 12 and affect the insertion of the lid 52 on the battery cell enclosure 12.

The sheet 92 further comprises an inwardly bent top segment 96 along the upper edges of the regions of the sheet 92 that define the walls 72' to 78'. The top segment 96 has a size and an angle, such as 90 degrees for example, such that the segment 96 touches the outside of the walls of the battery pack enclosure 12 and creates a standoff when the battery pack enclosure 12 is inserted into the liquid cooled enclosure 70. This provides for an enclosed space between the walls of the battery pack enclosure 12 and the liquid cooled enclosure 70 which allows for the passage of a liquid or a gas on the outside of the battery pack enclosure 12 to take away heat from the battery pack enclosure 12 during operation.

The liquid cooled enclosure 70 also comprises apertures 82 and 84 on separate walls for intake and outlet of a cooling liquid (this may more generally be referred to as a cooling substance since in some cases a gas can be used for cooling). The intake aperture 82 allows for the intake of the cooling liquid. The cooling liquid absorbs and removes heat from the battery pack enclosure 12 and is removed from the outlet aperture 84. In the illustrated embodiments, the intake aperture 82 is provided on the end wall 72 and the outlet aperture 84 is provided on the other end wall 74. In other embodiments, the intake and outlet apertures 82 and 84 may be on the opposite side walls 76 and 78. The cooling liquid can be introduced into the liquid cooled enclosure 70 at a sufficient pressure, such as 6 pounds per square inch (psi), to control the flow of the cooling liquid and the amount of heat that is withdrawn by the cooling liquid.

Referring now to FIGS. 4A and 4C, in some embodiments, the liquid cooled enclosure 70 also comprises wheels mounted to a bottom portion thereof to facilitate movement and handling of the liquid cooled enclosure 70. As illustrated, the liquid cooled enclosure 70 may comprise a first wheel 86a and a second wheel 86b, both mounted on one side wall 76 and a third wheel 86c mounted on the other side wall 78. The first 86a and the second 86b wheels are mounted near the first and second end portions of the first side wall 76 respectively. The third wheel 86c is mounted to a mid-portion of the second side wall 78. The wheels 86a, 86b and 86c may be adhesively attached to the liquid cooled enclosure 70 using, for example, a bonding material 88. An advantage of using three wheels is that the weight of the liquid cooled enclosure 70 is substantially equally distributed among the three wheels as well as lower manufacturing cost since a fourth wheel is not used. In other embodiments, another wheel may be mounted on the other side wall 78.

Referring next to FIGS. 5A-5E, shown therein is an example embodiment of a series configuration 110 of a plurality of cell carrier assemblies 112a-112l that can be used with the battery pack system 10. The series configuration 110 also comprises connectors 114a-114k to provide electrical and mechanical connection between tabs 122 of different cells. The series configuration 112 of cell carrier assemblies, and therefore of the cells, is used to increase the voltage level that can be provided during operation of the battery pack system 10.

In the series configuration 112, each connector 114 connects a positive tab 122 of one cell with a negative tab 122 of another cell (usually an adjacent cell) to provide a series connection. FIG. 5E illustrates a top view of a battery pack system 10 showing cell carrier assemblies 112a-112i connected in series using connectors 114a-114e to connect one series of cell tabs such that the connector 114a provides a positive electrical connection for the battery pack system 10. The connectors 114g-114k are used to connect another series of cell tabs such that the connector 114j provides a negative electrical connection for the battery pack system 10. FIG. 5B illustrates a side view of the series configuration 110.

FIG. 5C illustrates a perspective view of a connector 114 that can be used to electrically and mechanically couple together cell tabs. The connector 114 comprises a body 116 with two sidewalls 118a and 118b which define a channel therebetween. The connector 114 also comprises an engagement member 120 that can fit within the channel defined by the sidewalls 118a and 118b. The engagement member 120 and the sidewalls 118a and 118b are shaped to provide slots to receive cell tabs 122 of opposite polarity in order to provide a series electrical connection between a first and a second cell or cell carrier assemblies 112. The engagement member 120 and the tabs 122 of the cells have complimentary angled or chamfered edges. The angled sidewalls 118*a* and 118*b* assist in guiding the cell tabs 122 into the body 116. The connector 114 also comprises coupling elements 124 that releasably couple cell tabs 122, such that each cell tab 122 is releasably secured between one of the sidewalls 118*a* and 118*b* and a corresponding face of the engagement member 120. As the coupling elements 124 are adjusted, the cell tabs 122 are compressed between the sidewalls 118*a* and 118*b* and the corresponding faces of the engagement member 120 such that substantially similar compression is applied to the cell tabs which results in improved resistive properties and allows for a high current pathway. In this example embodiment, the coupling elements 124 are screws but other releasable fasteners can be used in other embodiments such as spring clips or hook clips.

The connectors 114 may be made from any thermally conductive material, such as forged aluminum. Extruded aluminum may also be used as inexpensive alternative for the connector 114. Typically, heat dissipation from the cells is highest at the cell tabs 122. Accordingly, manufacturing the connectors 114 from thermally conductive materials provides some heat sinking which aids in thermal dissipation and heat distribution during the operation of the battery pack system 10.

Typically, cell tabs 122 are thin metal tabs that provide pathways for current flow. In conventional battery pack systems, the tabs 122 are welded or soldered together to electrically and mechanically connect them which generally require bending of the tabs 122. This creates an increased resistive electrical path at the weld or solder locations as well as the areas where the tab is greatly bent (conventionally the tab may be bent almost 90 degrees in some cases). In addition, solder locations provide lower thermal conductivity. This is especially problematic for battery pack systems 10 that are configured to provide high capacity power, voltage and/or current. Spot welding the cell tabs 122 together may provide a small, limited current path in the area of the spot weld making the battery pack system 10 susceptible to failure, especially in high power configurations and applications. Furthermore, welding the cell tabs 122 together makes it very difficult to detach the cells, for replacement of a failed cell for example, from the connectors without damaging the cell tabs 122 of non-faulty cells.

The connectors 114 provide the advantage of maximizing the contact area of the cell tabs 122 without creating an increased resistive current path as compared to welding or soldering, which is beneficial especially in high power configurations. For example, the sidewalls 118 of the body 116 are only slightly angled so that the cell tabs from different cells are not bent too much when they are connected to one another. In addition, use of the coupling elements 124 enables easy assembly and disassembly of the connectors 114 which allows for cell tabs 122 and therefore, cell carrier assemblies 112, to be easily connected and disconnected from one another without any damage to the cells or the cell tabs. This is beneficial since a failed cell carrier assembly 112 can be easily removed from the connector 114 and therefore from the battery pack system 10, and replaced by a new cell carrier assembly 112 without damaging the connector 114 and/or or the adjoining cell. The "clamping" function of the connectors 114 also provides for equal compression to the tabs which improves the resistive properties of the electrical connection between the connectors 114 and the tabs. Accordingly, the "clamping" function of the connectors provides several advantages and facilitates a cost-effective manufacturing of the battery pack system 10.

In some embodiments, the connectors 114 may also be manufactured to have insulated outer surfaces. For example, the outer surface of the body 116 of the connectors 114 may be powder coated to provide insulated surfaces. This is advantageous since it can allow for a decrease in the overall size of a battery pack system 10 by tightly packing and connecting the cell carrier assemblies while still maintaining electrical isolation between adjacent connectors 114 due to the insulated outer surfaces of the connectors 114. However, a certain portion of the outer surface of the connectors 114, such as a top portion of the connectors 114, are uninsulated so that the connectors 114 may also be electrically coupled with electronic circuitry to provide voltage and/or temperature information to the battery management system for the tabs that are in electrical connection with the connectors 114 (this also applies to the connectors and bus bars used in the parallel configurations described in FIGS. 6A-6C).

Referring now to FIG. 6A, shown therein is an example embodiment of a parallel configuration 130 of three cells 132*a*, 132*b* and 132*c* that can be used within the battery pack enclosure 12. Even though the cell carrier assemblies for cells 132*a*, 132*b* and 132*c* are not shown, the discussion herein is equally applicable to cell carrier assemblies that are connected in a parallel configuration. In general, cells can be connected to one another in parallel in several groups to form groups of parallel cells that can then be connected to one another in series in order to create a single safe high amperage and Amp-Hour cell configuration.

The battery pack system 10 comprises connectors 134 to connect together tabs of several cells having the same polarity; i.e. a positive tab of one cell with a positive tab of another cell, or a negative tab of one cell with a negative tab of another cell together to provide electrical coupling. There can be other embodiments of the connector 134 that connect more than 3 cells in a parallel configuration. The parallel configuration of cells is used to raise the current level that can be provided by the battery pack system 10.

Referring now to FIGS. 6B and 6C, shown therein is an example embodiment of a connector 134 for connecting cells 132*a*, 132*b* and 132*c* in parallel. The connector 134 comprises a body 135 with first and second sidewalls 136*a* and 136*b* such that the sidewalls define a channel therebetween. The connector 134 also comprises a first engagement member 138 and a second engagement member 140 that can be received within the channel between the sidewalls 136*a* and 136*b*. The engagement members 138 and 140 and the sidewalls 136*a* and 136*b* are configured to provide slots to receive cell tabs of similar polarity from 3 different cells. The sidewalls 136*a* and 136*b* of the body 135 have angled surfaces 144 at an angle slightly less than 90 degrees to provide the slots. The engagement members 138 and 140 and sidewalls 136*a* and 136*b* have complimentary angled edges 144 as illustrated in FIG. 6C. The angled edges 144 assist in guiding the cell tabs into the body 135 of the connector 134.

The connector 134 also comprises a set of coupling elements 142 to releasably secure a first tab of the cell 132*a* between the sidewall 136*a* and the engagement member 138, a first tab of the cell 132*b* between the engagement members 138 and 140 and a first tab of the cell 132*c* between the engagement member 140 and the sidewall 136*b*, where the first tabs of cells 132*a*, 132*b* and 132*c* have a similar polarity. The coupling elements 142 can be similar to the coupling elements 124 and the alternative embodiments described thereof.

The connector 134 is made of thermally conductive materials and provides a thermal heat sink for the first, second and third tabs to remove heat from the corresponding cells during operation. In general, the connector 134 provides the same advantages as the connector 114.

The battery pack system 10 may comprise any number of cells or cell carrier assemblies arranged in a parallel configuration. For example, when two cells are arranged in a parallel configuration, the battery pack system 10 comprises a first connector 134 configured to releasably secure the first tab of the first cell and the first tab of the second cell where the first tab of the first and the second cells have similar polarities. The battery pack system 10 also comprises a second connector 134 configured to releasably secure the second tabs of the first cell and the second cell where the second tabs have a similar but opposite polarity to the first tabs of the first and second cells. Accordingly, the first and the second connectors 134 provide a parallel electrical coupling between the first and second cells in use. In other words, the parallel configuration uses one connector 134 to releasably secure positive tabs of the cells and another connector 134 to releasably secure negative tabs of the cells to provide a parallel electrical connection between the cells during operation.

Referring now to FIG. 6D, shown therein is a top view of an example embodiment of a series-parallel configuration of cells that can be used in a battery pack system 10. In this example embodiment, assembly 130a comprises three cells in a parallel configuration such that the positive tabs of the three cells are connected using a connector 134a and the negative tabs of the three cells are connected using a connector 134d. Similarly, assembly 130b comprises a parallel configuration of three cells where the negative tabs of the three cells are connected with a connector 134b and the positive tabs of the three cells are connected with a connector 134e. Assembly 130c also comprises a parallel configuration of three cells where the positive tabs of the three cells are connected with a connector 134c and negative tabs of the three cells are connected with a connector 134f. The parallel configuration of three cells in each of the assemblies 130a, 130b and 130c provides current scaling.

The assemblies 130a, 130b and 130c are configured in a series configuration to provide voltage scaling. Bus bars 144, 146, 148 and 150 are used to provide a series electrical coupling of the assemblies 130a, 130b and 130c. Each bus bar 144, 146, 148 and 150 is configured to releasably couple a first connector of a first group of parallel cells with a second connector of a second group of parallel cells, such that the first and second connectors have opposite polarities. For example, bus bar 146 connects the connector 134b having a negative polarity to the connector 134c having a positive polarity.

Referring now to FIGS. 7A-7E, shown therein is another example embodiment of a battery pack enclosure 160. The battery pack enclosure 160 comprises a front wall handle 162b, a first side wall handle 162a and a second side wall handle 162c. The handles 162a to 162c assist in handling or lifting the battery pack system housed within the battery pack enclosure 160.

This is advantageous in battery pack systems comprising a large number of cell carrier assemblies or those that are heavier in weight. In battery pack systems comprising a fewer number of cells, or for lighter battery pack systems, the handles 162a to 162c may be optional.

The battery pack enclosure 160 further comprises wheels 166, 168 170 and 172. Each of the wheels 166 and 168 are generally mounted near first and second end portions of a first side wall. The wheel 170 is generally mounted near the mid-portion of a second side wall of the battery pack enclosure 160 that is generally opposite to the first side wall. In at least some embodiments, the wheels 166 to 172 are mounted higher than the bottom of the battery pack enclosure 160 to ensure their indexing properties are not affected when the battery pack enclosure 160 is set down. If the wheels 166 to 172 are lower than the bottom of the battery pack enclosure 160, the wheel mounting may be damaged or bent if the battery pack enclosure 160 is dropped or set down with force.

The wheel 172 is mounted on the second side wall and is configured to assist in initial insertion of the battery pack enclosure 160 onto an elevated surface, such as a rack. For this purpose, the wheel 172 is mounted higher with reference to the bottom of the battery pack enclosure 160 in comparison to the wheels 166 to 170. For example, the second side wall wheel 172 may be mounted ~⅛" higher than the other wheels 166 to 170. In some embodiments, the wheel 172 is optional.

The wheels 168 to 172 are configured to provide for ease of installation and handling of heavy battery pack systems. The three wheels 166, 168 and 170 are configured to be load bearing wheels and allow for substantially equal distribution of weight of the battery pack system on all of these three wheels. The higher mounting of the wheel 172 ensures that once the battery pack enclosure 160 is inserted onto an elevated surface, the load of the battery pack enclosure 160 rests on the wheels 166, 168 and 170.

The wheels 166 to 172 may be made of urethane. For example, the wheels 166, 168 and 170 may be low cost roller blade skate wheels made of urethane.

The battery pack enclosure 160 also comprises a battery pack interlock latching assembly 164, a data connector 174 and power connectors 176. In this example embodiment, the data connector 174 and the power connectors 176 are mounted on a rear wall of the battery pack enclosure 160.

The data connector 174 is configured to communicate data signals to and from the printed circuit board 34. The data connector 174 can be a parallel connector, a USB connector or a micro-USB connector. The power connectors 176 of the battery pack enclosure 160 are configured to provide an electrical power connection to an electrical load or an electrical connection with other battery pack systems. For example, the power connectors 176 allows a battery pack system to be connected in series or parallel with another battery pack system, as is described in more detail with respect to FIGS. 9A-90. In other embodiments, the data connector 174 and the power connectors 176 can be at other locations. For example, plus and minus power connectors can be near upper opposite end portions on a wall of the battery pack enclosure 160. Also, there can be embodiments in which the data connector 174 is not between the power connectors 176 and/or the data connector 174 and the power connectors 176 are not at the center of the wall of the battery pack enclosure 160.

Figure 8C:
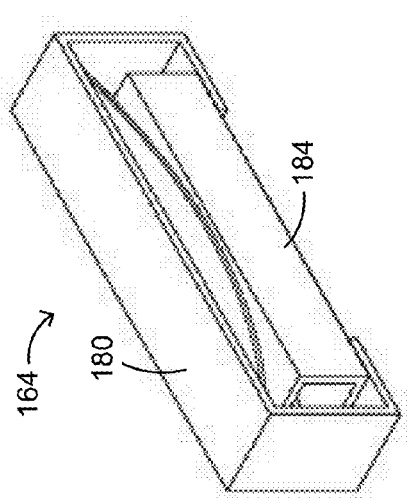
FIG. 8C is a front perspective view of the interlock latching assembly of FIG. 8A prior to release of the latch.
Figure 8D:
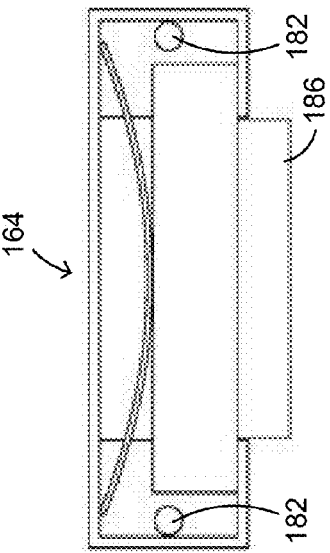
FIG. 8D is a front view of the interlock latching assembly of FIG. 8A after release of the latch.
Figure 8E:
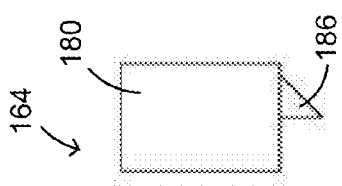
FIG. 8E is a side view of the interlock latching assembly of FIG. 8A after release of the latch.
Figure 8A:
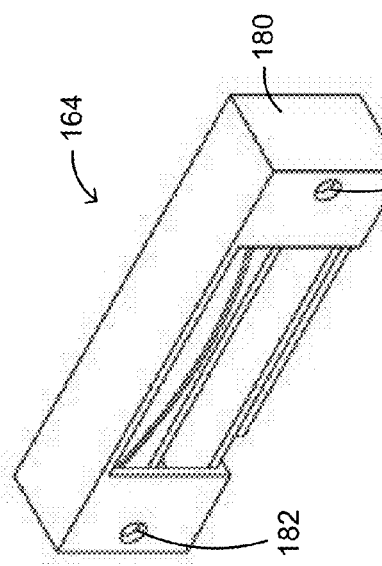
FIG. 8A is a rear perspective view of an interlock latching assembly for a battery pack enclosure prior to release of a latch.
Figure 8B:
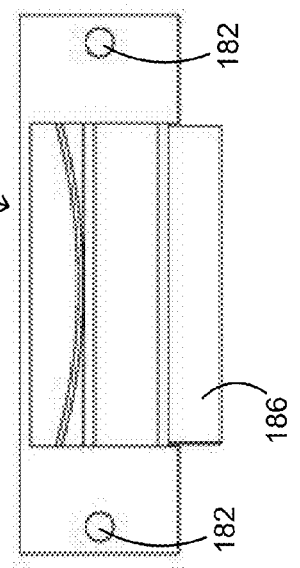
FIG. 8B is a rear view of the interlock latching assembly of FIG. 8A after release of the latch.

Referring now to FIGS. 8A-8E, shown therein is an example embodiment of the battery pack interlock latching assembly 164. The interlock latching assembly 164 comprises a latch housing 180, apertures 182, a lever 184 slidably mounted within the latch housing 180 and a striker 186 coupled to the lever 184. The striker 186 acts as a latch or locking mechanism. The interlock latching assembly 164 is mounted on an exterior portion of the battery pack enclosure 160 to secure the battery pack enclosure 160 at a fixed location. Fasteners such as screws, nails and the like can be applied through the apertures 182 to mount the interlock latching assembly 164 to the battery pack enclosure 160. The lever 184 and striker 186 are moveable between a first position in which the striker 186 is disposed within the latch housing 180, as illustrated in FIGS. 8A and 8C and a second position in which the striker 186 extends downward away from the latch housing 180 to engage a slot on an external fixed element to secure the battery pack enclosure 160 in a fixed location.

The striker 184 is designed to operate in a vertical and non-pivoting manner. By limiting the striker 184 to a vertical and a non-pivoting motion, the horizontal movement of the battery pack system 10 is controlled. This provides the advantage of maintaining the data connector 174 and power connectors 176 at a fixed location which helps to prevent cables that are connected to these connectors from becoming unseated during operation.

Accordingly, the interlock latching assembly 164 is configured to prevent the removal or uninstallation of a battery pack system until data and power cables are safely disconnected from the data connectors 174 and power connectors 176 respectively. The interlock latching assembly 164 can also be used to prevent the removal or uninstallation of a battery pack system until certain fail safe or unlocking conditions are successfully met.

Figure 9A:
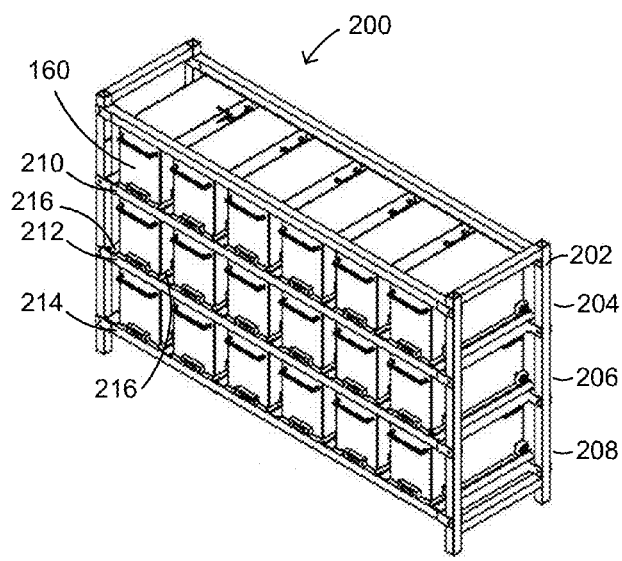
FIG. 9A is a perspective view of an example embodiment of a battery pack rack assembly.
Figure 9C:
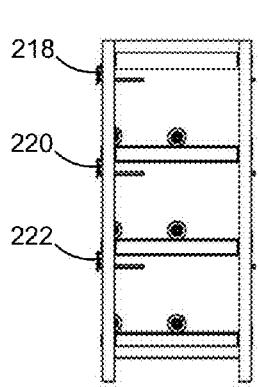
FIG. 9C is a side view of the battery pack rack assembly of FIG. 9A.
Figure 9B:
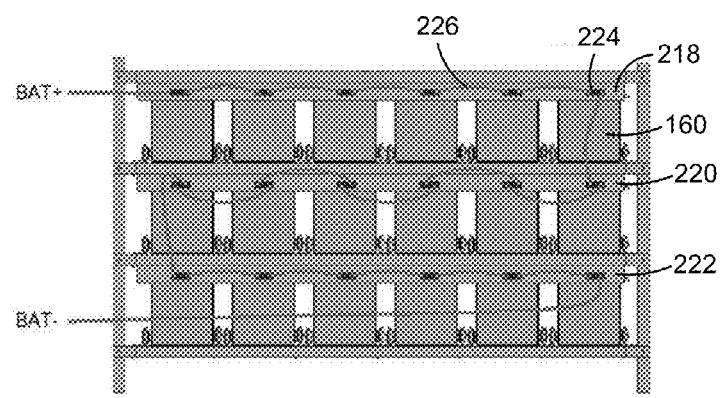
FIG. 9B is a rear view of the battery pack rack assembly of FIG. 9A.

Referring now to FIGS. 9A-9C, shown therein is an example embodiment of a battery pack rack assembly (or a rack assembly) 200. A rack assembly 200 is configured to contain a plurality of battery pack enclosures 160 of battery pack systems. In some embodiments, the liquid cooled enclosure 70 can also be used with the battery pack enclosures. Accordingly, although the discussion below is with respect to battery pack systems having the battery pack enclosure 160, it is equally applicable to battery pack systems having the liquid cooled enclosure 70.

The rack assembly 200 may be used for a variety of purposes. For example, the rack assembly 200 may be used to transport a plurality of battery pack systems from a manufacturing or assembly plant to the end customer. The rack assembly 200 may also be used to provide an overall voltage and/or current higher than that of a single battery pack system by interconnecting several battery pack systems in various serial or parallel configurations as the case may be. For example, by arranging a plurality of battery pack systems in a parallel configuration an increased overall current can be achieved and by arranging a plurality of battery pack systems in a series configuration an increased overall voltage can be achieved. As illustrated in FIG. 9B, the battery pack systems are all connected in series. A combination of series and parallel configurations of battery power systems may also be used to provide an increase in both the overall current and voltage. For example, the six battery pack systems on each row of the rack assembly 200 can be connected in series and then the battery pack systems at the ends of the various rows of the rack assembly 200 can be connected in parallel to provide a 6S3P configuration (i.e. 3 groups of 6 battery systems each connected in series and the three 3 groups connected in parallel).

The rack assembly 200 comprises a frame 202 and a plurality of levels or platforms 204, 206 and 208 to hold and support a plurality of battery pack enclosures 160. In alternative embodiments, there can be one, two or more than three levels. The rack assembly 200 further comprises a plurality of indexing rails 216 (only two of which are numbered for illustrative purposes) such that each indexing rail 216 provides an area of support for a battery pack system. In this example, the indexing rails 216 can be U-shaped or V-shaped to provide a channel to receive the wheels of the battery pack enclosure 160. By varying the number of levels and the number of indexing rails 216, the rack assembly 200 provides a modular design to house a number of different battery pack systems.

The rack assembly 200 also comprises engagement rails 210, 212 and 214 mounted generally perpendicular to the indexing rails 216 at the front of the rack assembly 200 and power rails 218, 220 and 222 mounted at the back or rear of the rack assembly 200 and generally parallel to the engagement rails 210, 212 and 214. The engagement rails 210, 212 and 214 have slots that are configured to be engaged by the striker 186 of the interlock latching assembly 164 in order to maintain the battery pack enclosure 160 in a fixed location and to prevent movement during operation thereby preventing the unseating of cables connected to the data connector 172 and power connectors 174 (movement may cause electrical failure which is prevented by this locking mechanism). The power rails 218, 220 and 222 have a plurality of slots 224 to allow access to the data connector 172 and the power connectors 174 of the battery pack enclosures 160. Data cables to connect to the data connectors 172 are used but are not shown for ease of illustration.

Power cables 226 are used to connect to the power connectors 174 of the battery pack enclosures 160. The cables can be connected in a variety of ways to connect the battery pack systems in a series, parallel or a combination of a series and parallel electrical configuration. The power cables 226 and the power connectors 174 provide an advantage of inserting battery pack enclosures 160 into the rack assembly 200 without having to enter the rear of the rack assembly 200 and/or manually bolt the power cables 226 onto the battery pack enclosures 160. This is especially advantageous when the rack assembly 200 comprises a very large number of battery pack enclosures 160 as the power in the power cables 226 tends to be very high in those configurations.

In embodiments where the battery pack enclosures 160 comprise a front wall handle 162b, a first side wall handle 162a and/or a second side wall handle 162c, the rack assembly 200 is configured to prove clearance for the handles. The handles may be used to handle or lift the battery pack enclosures 160 and insert them into the rack assembly 200.

The indexing rails 216 have a channel configuration to center the y-axis and control the z-axis of the battery pack enclosure 160 so that it is properly indexed to the data and power connectors 174 and 176. This provides a safety feature as it ensures that installers do not have to connect high power cables to the battery pack enclosure 160 when servicing and or installing it onto the rack assembly 200. The installers simply set a front wheel 166 of the battery pack enclosure 160 into the channel of an indexing rail 216, follow on with the opposing wheel 170 mounted at the middle of the battery pack enclosure and then the wheel 168. At this point the installer completes the connection with a simple pressing force forward to engage the interlock latching assembly 164. The handles 162a to 162c on the battery pack enclosure 160 ensures that two persons lift and insert the battery pack enclosure 160 onto the rack assembly 200. In some cases, the battery pack enclosure 160 and its contents weigh 100 to 200 pounds (lbs) and for safety reasons two persons should insert the battery pack enclosure 160 onto the rack assembly 200. If one person tries to install a battery pack enclosure 160 onto the rack assembly 200, the offset of the handles 162a to 162c will tilt the battery pack enclosure 160 making it difficult to insert.

It should also be noted that the rack assembly 200 has an open construction since it essentially consists of a frame. This open construction is advantageous as it allows for thermal conduction of the air that surrounds the battery pack enclosures and also spaces apart adjacent battery pack enclosures to promote cooling of the battery pack enclosures during use.

The battery pack systems 10 and the rack assembly 200 may be customized for a variety of configurations. In one example, each battery pack system 10 may comprise twelve cell carrier assemblies 22 connected in series. Such a configuration may be referred to as a 12S1P configuration. A battery pack system 10 comprising such a cell carrier assembly configuration may have dimensions of 12"×13"×18" (i.e. height, length and depth) and may weigh 30 kg or 66 lbs. In this example, the walls of the battery pack enclosure can be made from 6 mm thick Aluminum.

In another example, each battery pack system 10 may comprise 84 cell carrier assemblies 22 connected in series. The series connection of 84 cell carrier assemblies 22 may be provided as seven modules connected in series, where each module has twelve cell carrier assemblies 22 connected in series. Such a configuration may be referred to as an 84S1P configuration. A battery pack system 10 comprising such a cell carrier assembly configuration may have dimensions of 19"×10.5"×26" and may weigh 100 kg or 220 lbs. In some embodiments, each of the 84 cell carrier assemblies 22 may comprise a cell rated at 40 Ampere-Hours (Ah). In some other embodiments, each of the 84 cell carrier assemblies may comprise a cell rated at 75 Ah (in this case the depth of the battery pack enclosure is about 34"). In both of these examples, the walls of the battery pack enclosure can be made from 6 mm thick Aluminum.

It should be noted that there may be embodiments in which there are a plurality of rack assemblies 200 that are connected to one another to meet the voltage and current requirements of a power application. In these cases, the Bat+ and Bat− connections (see FIG. 9A) of the battery rack can be connected to the Bat+ and Bat− connections of other rack assemblies 200 to achieve a series connection, a parallel connection or a combination of a series and parallel combination.

While the applicant's teachings described herein are in conjunction with various embodiments for illustrative purposes, it is not intended that the applicant's teachings be limited to such embodiments. On the contrary, the applicant's teachings described and illustrated herein encompass various alternatives, modifications, and equivalents, without departing from the embodiments, the general scope of which is defined in the appended claims.

The invention claimed is:

1. A battery pack system for providing electric power during use, wherein the battery pack system comprises:
   at least two cell carrier assemblies configured to provide electric current during use, each of the at least two cell carrier assemblies having a substantially planar configuration, each cell carrier assembly having a cell configured to provide the electrical current, the cell having positive and negative tabs to provide positive and negative electrical connections;
   a battery pack enclosure for housing the at least one cell carrier assembly, the battery pack enclosure having at least one wall with at least one channel sized to receive an edge of the cell carrier assembly to maintain the at least one cell carrier assembly at a location within the battery pack enclosure and provide a thermal pathway during use; and
   at least two connectors to releasably engage tabs from different cells, each of the at least two connectors comprising:
      a body with angled sidewalls defining a channel therebetween, at least one engagement member disposed within the channel, the at least one engagement member having at least one angled edge that is complimentary to one of the angled sidewalls of the body, and coupling elements to releasably secure the tabs from the different cells between the at least one engagement member and the sidewalls of a given connector to provide an electrical connection between the different cells and a thermal heat sink for the tabs in use.

2. The battery pack system of claim 1, wherein the battery pack enclosure comprises opposed side walls each having at least one channel opposite one another to receive opposing side edges of each of the at least two cell carrier assemblies and provide first and second thermal pathways during use.

3. The battery pack system of claim 2, wherein the battery pack enclosure comprises a bottom wall having at least one channel aligned with the at least one channels of the opposed side walls to receive a bottom edge of each of the at least two cell carrier assemblies and provide a third thermal pathway during use.

4. The battery pack system of claim 1, wherein each of the at least two cell carrier assemblies further comprise:
   a cell carrier disposed at one face of the cell to provide a mounting surface for mounting the cell, wherein the mounting surface provides a fourth thermal pathway during use.

5. The battery pack system of claim 4, wherein the cell carrier comprises upper and lower tabs that extend away from the mounting surface and are disposed to receive upper and lower edges of the cell, the lower tab being electrically insulated from the lower edge of the cell.

6. The battery pack system of claim 4, wherein the one face of the cell and the mounting surface of the cell carrier are adhesively bonded with a thermally conductive adhesive.

7. The battery pack system of claim 4, wherein the cell carrier is made from a metal, a ceramic, a thermal conductive plastic or a composite material thereof.

8. The battery pack system of claim 4, wherein each of the at least two cell carrier assemblies comprise a second cell carrier disposed at a second face of the cell and having a thermal insulative coating on an exterior surface to provide thermal insulation for the cell from an adjacent cell carrier assembly.

9. The battery pack system of claim 4, wherein the battery pack system comprises a thermal mat disposed between adjacent cell carrier assemblies to provide a thermal barrier therebetween.

10. The battery pack system of claim 1, wherein the battery pack enclosure is formed from a single sheet of material with grooves defining regions for a bottom wall, front and rear walls at opposite ends of the bottom wall and side walls at opposite sides of the bottom wall, wherein the grooves have angled edges that are configured to allow for bending of the front, rear and side walls with respect to the bottom wall during manufacture.

11. The battery pack system of claim 10, wherein the battery pack enclosure further comprises a lid and outer edges of the front, rear and side walls comprise an inner groove for releasably receiving outer edges of the lid.

12. The battery pack system of claim 1, wherein the battery pack enclosure comprises an end wall with an intake aperture and a side wall with at least one spacing member disposed along the side wall to define a lower air pathway between a bottom edge of each of the at least two cell carrier assemblies and a bottom wall of the battery pack enclosure, wherein cool air enters the intake aperture and travels along the lower air pathway to provide air cooling for each of the at least two cell carrier assemblies during use.

13. The battery pack system of claim 12, wherein the battery pack enclosure further comprises a baffle and a fan, wherein the baffle is disposed near the end wall having the intake aperture to separate the lower air pathway from an upper air pathway disposed along a top portion of the battery pack enclosure and the fan is mounted on the end wall having the intake aperture, wherein, during use, air receives heat from each of the at least two cell carrier assemblies as it rises from the lower air pathway to the upper air pathway and is removed from the battery pack enclosure by the fan.

14. The battery pack system of claim 1, further comprising a liquid cooled enclosure that surrounds the battery pack enclosure, the liquid cooled enclosure having front, rear and two opposed side walls having upper edges spaced apart from and adjacent to front, rear and two opposed side walls of the battery pack enclosure to define a liquid pathway between the battery pack enclosure and the liquid cooled enclosure, the liquid cooled enclosure further comprising intake and outlet apertures on separate walls, wherein during use a liquid supplied to the intake aperture to remove heat from the battery pack enclosure is removed from the outlet aperture.

15. The battery pack system of claim 14, further comprising first and second wheels mounted near first and second end portions of a first side wall of the liquid cooled enclosure and a third wheel mounted to a mid-portion of a second side wall of the liquid cooled enclosure.

16. The battery pack system of claim 4, wherein each of the at least two connectors comprise moveable components to releasably engage the tabs from the different cells and provide electrical and mechanical coupling during use.

17. The battery pack system of claim 16, wherein a first connector of the at least two connectors is configured to releasably secure a first tab of a first cell and a first tab of a second cell between the at least one engagement member and the sidewalls of the first connector to provide the electrical connection between the first and second cells and the thermal heat sink for the first and second tabs in use.

18. The battery pack system of claim 17, wherein the first tab of the first cell and the first tab of the second cell have opposite polarities and the first connector provides a series electrical coupling between the first and second cells in use.

19. The battery pack system of claim 17, wherein the first tab of the first cell and the first tab of the second cell have similar polarities and are coupled by the first connector and wherein a second connector of the at least two connectors couples a second tab of the first cell and a second tab of the second cell having a similar but opposite polarity to the first tabs of the first and second cells, wherein the first and second connectors provide a parallel electrical coupling between the first and second cells in use.

20. The battery pack system of claim 17, wherein the sidewalls of the first connector are angled substantially less than 90 degrees and the at least one engagement member and the tabs of the cells have complimentary angled edges.

21. The battery pack system of claim 17, wherein the first connector is made from metal to provide high thermal dissipation in use.

22. The battery pack system of claim 16, wherein a first connector of the at least two connectors comprises a body with first and second sidewalls defining a channel therebetween, first and second engagement members disposed within the channel and coupling elements to releasably secure a first tab of a first cell between the first sidewall and the first engagement member, a first tab of a second cell between the first and second engagement members and a first tab of a third cell between the second engagement member and the second sidewall, the first tabs having a similar polarity and wherein a second connector of the at least two connectors comprises a similar structure as the first connector to releasably secure second tabs of the first, second and third cells, the second tabs having a similar but opposite polarity as the first tabs, wherein during use the first and second connectors provide a parallel electrical connection between the first, second and third cells and a thermal heat sink for the first, second and third tabs.

23. The battery pack system of claim 16, wherein the at least two connectors are configured to couple the plurality of cells into several groups of parallel cells, and the battery pack system further comprises bus bars, wherein a bus bar is configured to releasably couple a first connector of a first group of parallel cells with a second connector of a second group of parallel cells in a series or parallel electrical connection.

24. The battery pack system of claim 1, further comprising a printed circuit board having electrical circuits that are electrically coupled to the at least two cells, the printed circuit board being mounted adjacent to a wall or lid of the battery pack enclosure to provide a thermal pathway during use.

25. The battery pack system of claim 24, further comprising power and data connectors mounted on an exterior portion of the battery pack enclosure and electrically coupled to at least one of the printed circuit board and the at least two cells.

26. The battery pack system of claim 1, further comprising first and second wheels mounted near first and second end portions of a first side wall of the battery pack enclosure and a third wheel mounted to a mid-portion of a second side wall of the battery pack enclosure.

27. The battery pack system of claim 26, further comprising a fourth wheel mounted near an end portion on the second side wall of the battery pack enclosure, the fourth wheel having a bottom edge that is higher than a bottom edge of the first, second, and third wheels and lower than a bottom wall of the battery pack enclosure, wherein the first, second, and third wheels are configured to be load-bearing wheels.

28. The battery pack system of claim 1, wherein the battery pack enclosure is made of metal.

29. The battery pack system of claim 1, further comprising an interlock latch mounted on an exterior portion of the battery pack enclosure to secure the battery pack enclosure at a fixed location.

30. The battery pack system of claim 29, wherein the interlock latch comprises a latch housing, a lever slidably mounted to the latch housing and a striker coupled to the lever, wherein the lever and striker are moveable between a first position in which the striker is disposed within the latch housing and a second position in which the striker extends vertically away from the latch housing to engage a slot on an external fixed element to secure the battery pack enclosure in the fixed location.

31. A battery pack system for providing electric power during use, wherein the battery pack system comprises:
at least one cell carrier assembly having a substantially planar configuration and comprising a cell configured to provide electric current during use, the cell having tabs to provide positive and negative electrical connections and a cell carrier disposed at one face of the cell to provide a mounting surface for mounting the cell;
at least one pair of connectors to releasably apply a compressive force to one of the tabs of the at least one cell and provide electrical coupling during use, each of the connectors comprising
a body with sidewalls defining a channel therebetween, at least one engagement member disposed within the channel, the at least one engagement member having angled edges that are complimentary to at least one of the sidewalls of the body, and at least one coupling element to releasably secure a first tab of the cell between the at least one engagement member and the sidewalls of a given connector to provide an electrical connection between and a thermal sink in use; and a battery pack enclosure for housing the at least one cell carrier assembly.

32. The battery pack system of claim 1, wherein the coupling elements of the given connector are configured to move the at least one engagement member and the body of the given connector towards or away from one another to releasably engage or disengage one of the tabs of the cell.

33. The battery pack system of claim 31, wherein the coupling elements of the given connector are configured to move the at least one engagement member and the body of the given connector towards or away from one another to releasably engage or disengage one of the tabs of the cell.

* * * * *